United States Patent
Chen

(10) Patent No.: US 7,253,835 B2
(45) Date of Patent: Aug. 7, 2007

(54) METHOD AND APPARATUS FOR ESTIMATING A CAMERA REFERENCE HORIZON

(75) Inventor: Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 692 days.

(21) Appl. No.: 10/329,320

(22) Filed: Dec. 23, 2002

(65) Prior Publication Data

US 2004/0125210 A1 Jul. 1, 2004

(51) Int. Cl.
- H04N 5/228 (2006.01)
- H04N 9/47 (2006.01)
- H04N 5/33 (2006.01)
- G08G 1/017 (2006.01)
- G06K 9/00 (2006.01)
- G06F 17/10 (2006.01)

(52) U.S. Cl. ............... 348/208.15; 348/142; 348/148; 348/169; 340/937; 382/104; 701/301

(58) Field of Classification Search ............... None
See application file for complete search history.

(56) References Cited

U.S. PATENT DOCUMENTS

| | | | | |
|---|---|---|---|---|
| 5,303,019 A | * | 4/1994 | Irie | 348/142 |
| 5,355,326 A | * | 10/1994 | Florent | 348/208.14 |
| 5,555,312 A | * | 9/1996 | Shima et al. | 382/104 |
| 5,592,567 A | * | 1/1997 | Kilger | 340/937 |
| 5,617,085 A | * | 4/1997 | Tsutsumi et al. | 340/903 |
| 5,850,254 A | * | 12/1998 | Takano et al. | 348/135 |
| 6,246,961 B1 | * | 6/2001 | Sasaki et al. | 701/301 |
| 6,370,474 B1 | * | 4/2002 | Hiwatashi et al. | 348/148 |
| 6,438,491 B1 | * | 8/2002 | Farmer | 348/142 |
| 6,628,804 B1 | * | 9/2003 | Edanami | 382/104 |

* cited by examiner

*Primary Examiner*—David Ometz
*Assistant Examiner*—Nhan T. Tran
(74) *Attorney, Agent, or Firm*—Tope-McKay & Associates

(57) ABSTRACT

A method, apparatus, and computer program product are presented for estimating a camera reference horizon $\hat{Y}_0$. Operations include receiving images including projections of objects including horizontal edges. Vertical motion is estimated for the images and is stored. The projection of horizontal edges in the images is computed. The projected edges are segmented out and motion is compensated. Projections of the horizontal edges from image to image are used to generate tracks. Active track storage is maintained by adding data to update the storage from each subsequent image. The tracks are screened using a criteria set to produce a subset of tracks to enhance track reliability. Distances to, and heights of, the objects are then estimated. Further screening is performed by calculating an error criteria for each track and selecting a subset satisfying the error criteria. The remaining tracks are used to generate a camera reference horizon estimate $\hat{Y}_0$.

57 Claims, 5 Drawing Sheets

METHOD AND APPARATUS FOR ESTIMATING A CAMERA REFERENCE HORIZON

RELATED APPLICATIONS

This application is related to U.S. patent application Ser. No. 09/886,931, titled "VISION-BASED HIGHWAY OVERHEAD STRUCTURE DETECTION SYSTEM", filed with the U.S. Patent and Trademark Office on Jun. 20, 2001, which is incorporated by reference herein in its entirety.

BACKGROUND (1) Technical Field

The present invention relates to image and video processing. More specifically, the present invention relates to a method and apparatus for estimating the location of a camera reference horizon.

(2) Discussion

There has been notable progress in the development of fully autonomous automobiles capable of navigating through traffic without human intervention. For example, systems may use sensing technology to warn drivers of impending collisions, or even take control of a vehicle in certain situations when the driver either ignores or cannot heed a warning. While the autonomous vehicle will probably exist at some time, existing vehicle systems still have many challenges to overcome in order to be practical.

Some collision warning systems use a radar-based detector, combined with a vision-based land-sensing module, to detect and track vehicles ahead of the host vehicle. The radar-based system monitors the moving pattern of all objects tracked by the radar sensor to determine potential threats along the host's path. The host's path is provided by the lane module. The radar sensor has a limitation in that it not only detects moving and stationary vehicles, but also many fixed roadway infrastructures, such as overpasses and overhead signs. A collision warning system that provides frequent false alarms can be a nuisance rather than a help to drivers.

Typical radar sensors are designed to have a small vertical field of view (VFOV) ~5 degrees in an effort to avoid detection of overhead objects. However, even at a detection range of 120 meters, some overhead objects are still routinely detected. There are a number of possible explanations for the false alarms, including, misalignment of the radar axis relative to the ground, often as a result of the radar transmitter being aimed too high. Other factors include ground reflections, which can create "ghosting". Additional possible sources of error include radar side lobes, and certain types of terrain. The terrain-based error sources can occur because overhead objects may actually be within the vertical field of view due to the slope of the road. Therefore redesigning a radar sensor to provide a narrower vertical beam will not likely be successful in solving the problem completely. Additionally, many of these solutions could result in a less robust system that might miss actual obstructions and may still generate false alarms. There is a need for a robust system that effectively warns users when there is a potential for collision and simultaneously minimizes or eliminates the number of false alarms.

For such a system to function optimally, it would be desirable to provide a subsystem for estimating the camera reference horizon in order to assist in identifying and eliminating overhead structures as objects that can trigger collision warnings.

SUMMARY

The present invention provides a method, an apparatus, and a computer program product for generating a camera reference horizon estimate. In a first aspect, the operations of the invention comprise:

receiving a sequence of images including projections of objects thereon, with projections including horizontal edges;

estimating vertical motion occurring in the sequence of images and storing the estimated vertical motion as a motion history;

computing the projection of the horizontal edges in the images;

segmenting the projected horizontal edges in the images;

compensating for motion in the images using the estimated vertical motion from the motion history;

tracking the projections of the horizontal edges from image to image to generate tracks representing objects and maintaining an active track storage by adding more data to update the active track storage from each subsequent image;

screening the generated tracks using screening criteria to produce a subset of tracks in order to enhance track reliability;

receiving the subset of tracks from the screening operation and estimating distances to the objects represented by the tracks and heights of the objects represented by the tracks;

further screening the subset of tracks by calculating an error criteria for each track and selecting a subset of remaining tracks satisfying the error criteria; and generating a camera reference horizon estimate $\hat{Y}_0$ from the remaining tracks.

In another aspect, the screening criteria used in the screening operation include rejecting those tracks that are below the current reference horizon; determining a track length for each track and keeping only those tracks that have track lengths in excess of a predetermined track length threshold; determining the dynamic range of the tracks and keeping only those tracks that have a dynamic range exceeding a dynamic range threshold; and determining an abnormality value for each track and ignoring tracks exceeding an abnormality threshold.

In a still further aspect, in the operation of further screening the subset of tracks, the error criteria used includes calculating a root-mean-squared fitting error for each track using the estimated distance and height, and excluding those tracks having a root-mean-squared fitting error exceeding a predetermined threshold.

In yet another aspect, the operations of the invention further comprise maintaining an active camera reference horizon estimate $\hat{Y}_0$; and updating the active camera reference horizon estimate $\hat{Y}_0$ with the generated camera reference horizon estimate based on the fulfillment of a criteria set.

In a further aspect, the images include image tops, and in the operation of updating the active camera reference horizon estimate $\hat{Y}_0$ is triggered based on the fulfillment of a the criteria set including: when a longest track exists in a number of images in the sequence of images, where the number exceeds a predetermined threshold; and when the longest track is within a predetermined distance from an image top.

In a yet further aspect, the operation of estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i d_i (Y_0 - r_i)^2 \\ -f \sum_i d_i (Y_0 - r_i) \end{bmatrix} \equiv \begin{bmatrix} W \\ Z \end{bmatrix}, \text{ where}$$

-continued $$U = \sum_i (Y_0 - r_i)^2 = \sum_i r_i^2 - 2Y_0 \sum_i r_i + MY_0$$

$$V = -f \sum_i (Y_0 - r_i) = f \left( \sum_i r_i - MY_0 \right)$$

$$W = \sum_i d_i (Y_0 - r_i)^2 = Y_0^2 \sum_i d_i^2 - 2Y_0 \sum_i d_i r_i + \sum_i d_i r_i^2,$$

$$Z = -f \sum_i d_i (Y_0 - r_i) = f \left( \sum_i d_i r_i - Y_0 \sum_i d_i \right)$$

and where the sum $\sum_i$ is for $i = 1$ to $M$;

$f$ is a camera focal length, $M$ is a length of a track, $r_i$ is a track location in an image, $Y_0$ is the camera horizon, and $d_i$ is the distance a vehicle hosting the camera has traveled since the first image;

thus, the matrices $A^t A$ and $A^t B$ can be updated incrementally as the HEP track length increases from M to M+1.

In another aspect of the present invention, in the operation of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \; T]^t, \text{ where}$$

$$R_k = \sum_{(i,j) \in \Theta_k} (r_{kj} - r_{ki})^2$$

$$P_k = \sum_{(i,j) \in \Theta_k} (r_{kj} - r_{ki})(d_{kj} - d_{ki})$$

$$Q = \sum_{k=1}^N q_k, \; q_k = \sum_{(i,j) \in \Theta_k} (d_{kj} - d_{ki})^2 \quad \begin{aligned} k &= 1, \ldots, N \\ \Theta_k &= \{(i,j) \mid j = i+s, 1 \le i, j \le M_k\} \end{aligned}$$

$$S_k = \sum_{(i,j) \in \Theta_k} (r_{kj} - r_{ki})(r_{kj} d_{kj} - r_{kj} d_{ki})$$

$$T = \sum_{k=1}^N t_k, \; t_k = \sum_{(i,j) \in \Theta_k} (d_{kj} - d_{ki})(r_{kj} d_{kj} - r_{kj} d_{ki})$$

where:
- i and j are matrix index variables,
- $\Theta_k$ is an index set including all possible pairings of $\{i,j\}$ that are separated by a fixed number of frames s,
- k is an index variable of tracks where the total number of tracks is represented by N,
- $M_k$ is the length of the kth track among a total of N tracks,
- $r_{kj}$ is the track position in image row coordinates at a jth image frame of the kth track;
- $r_{ki}$ is the track position in image row coordinates at a ith image frame of the kth track;
- $d_{kj}$ is a distance traveled by a vehicle at the jth frame of the kth track relative to the first frame, with $d_{k1}=0$ for all k;
- $d_{ki}$ is a distance traveled by a vehicle at the ith frame of the kth track relative to the first frame, with $d_{k1}=0$ for all k; and
- whereby the terms $R_k$, $P_k$, $q_k$, $S_k$, and $t_k$ are computed incrementally as new track points are added and new pairs of $\{i,j\}$ become part of the index set $\Theta_k$.

The invention may be implemented as a method, typically performed on a data processing system, as a computer program product in the form of computer-readable instructions stored on a computer-readable medium, and as an apparatus for operating the above-mentioned operations, the apparatus comprising a memory for storing data and processing results, a processor operationally coupled with the memory, the processor including means for receiving a sequence of images including projections of objects thereon, with projections including horizontal edges. The aspect further comprises means for performing the operations mentioned with respect to the various aspects discussed above.

BRIEF DESCRIPTION OF THE DRAWINGS

The objects, features and advantages of the present invention will be apparent from the following detailed descriptions of the various aspects of the invention in conjunction with reference to the following drawings.

DETAILED DESCRIPTION

Figure 1:
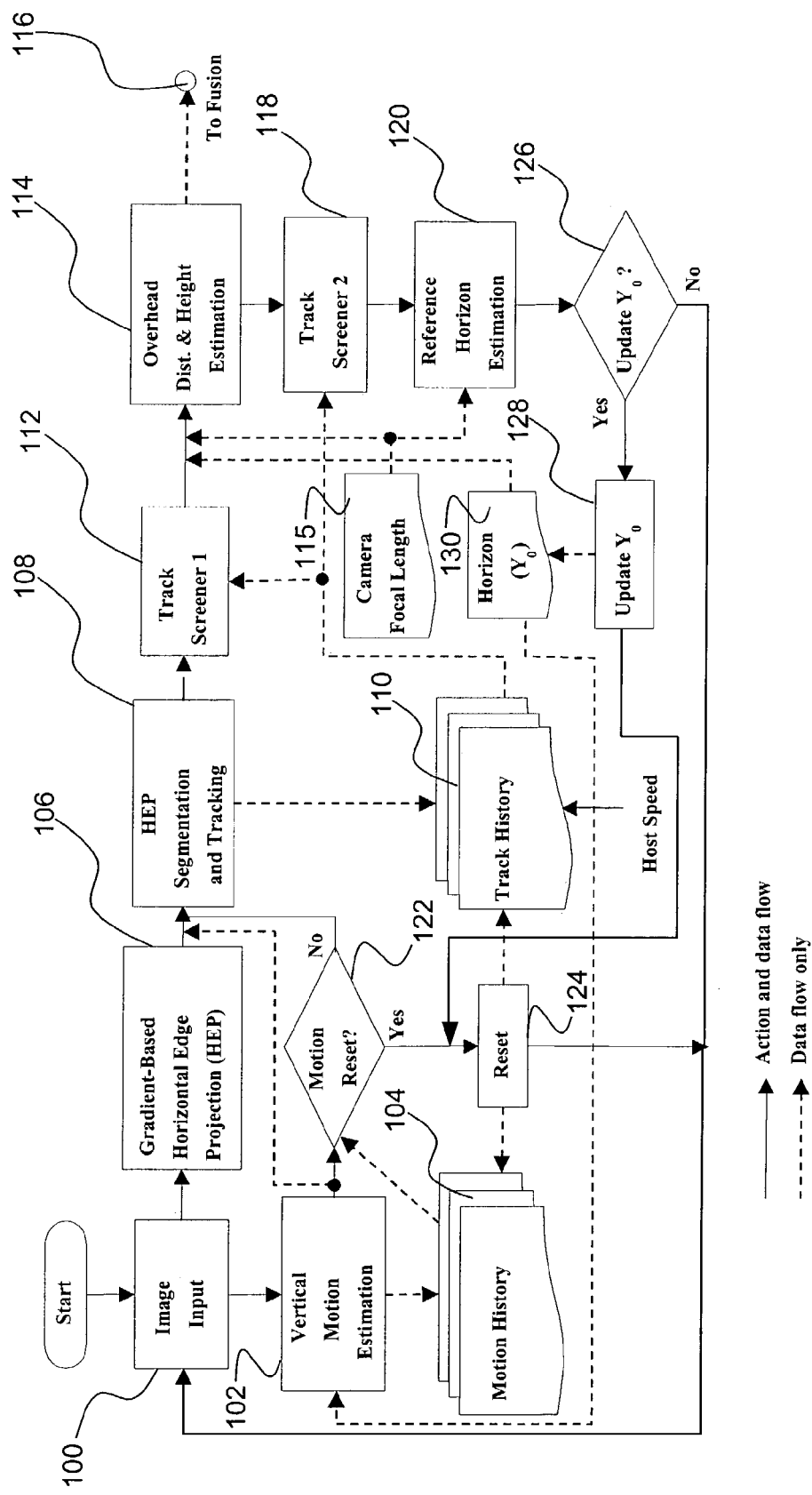
FIG. 1 is a block diagram showing the functional blocks (steps) of the present invention.

The present invention relates to image and video processing. More specifically, the present invention relates to a method and apparatus for estimating the location of a camera reference horizon. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. After developing the glossary, an overview of the present invention is provided, followed by a discussion of the specific details. Finally an example implementation is discussed in order to aid in providing a clear understanding of an application of the present invention.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more clearly explaining the terms used.

Abnormality—Screening criteria used in the first track screener include checking tracks for abnormalities by determining an abnormality value for each track and eliminating/ignoring tracks having an abnormality value in excess of an abnormality threshold. Many factors may go into the calculation of an abnormality, and the factors will vary depending on the goals of a particular application. An example of abnormality factors include when a track registers a negative height or distance value, determining whether an error vector associated with a track is overly large, etc. The abnormality value provides a check on the data extracted from the images in order to eliminate erroneous tracks.

Camera—This term is used herein to refer generally to an image source capable of supplying a sequence of images. In the most general sense, "camera", as used herein could be a database of stored images. However, in most applications, a camera is an imaging device such as a CCD video camera. The camera may operate in any area of the spectrum, and may, for example, be an optical camera, a radar-based camera, an IR camera, or even an acoustic imaging system. The important characteristic of the camera is the its ability to provide a sequence of images for processing.

Means—The term "means" as used with respect to this invention generally indicates a set of operations to be performed on a computer. Non-limiting examples of "means" include computer program code (source or object code) and "hard-coded" electronics. The "means" may be stored in the memory of a computer or on a computer readable medium.

(2) Overview

In one aspect, the present invention provides a method and apparatus for calibrating the reference horizon of a video camera mounted on a vehicle, such as an automobile. By tracking certain image features in a digitized image sequence from a video camera, the method automatically computes the reference horizon of the video camera images. In this aspect, the reference horizon of an in-vehicle video camera is calibrated for tasks such as lane tracking and collision warning. The reference horizon is one of the important system parameters used by vision systems to perform accurate detection and tracking of objects in video images. Rather than relying on other instruments, the present invention provides real-time updates to the reference horizon. The effective reference horizon of a vehicle may change under a variety of vehicle load and working conditions. Therefore, a fixed and accurate reference horizon does not exist, making it necessary to estimate the reference horizon in a moving vehicle on the road. Since the reference horizon is related to the stable-state vehicle pitch angle, this invention allows one to avoid the difficult task of calibrating the vehicle pitch every time a trip is begun.

The present invention will be discussed throughout this description in terms of its use for real-time overhead structure detection. The major functional blocks of the overhead structure detection are shown in FIG. 1, and are discussed briefly in order to facilitate further discussion of the horizon estimation technique. Note that the solid lines indicate the process or action/data flow and the dotted lines represent data flow only. The overhead structure detection system receives digitized video images 100 input from an in-vehicle video camera and a digitizer. Camera parameters such as color vs. black and white, resolution, and frame-rate are selected based on the goals of a particular implementation. The vertical motion estimation module 102 uses the current horizon estimate 130 and computes the relative image motion of two consecutive image frames in the vertical direction using a one-dimensional optical flow approach. Based on the relative motion, a vertical motion offset for each image frame relative to some reference frame is computed and stored in a motion history 104. After the vertical motion has been estimated, a determination regarding whether to reset the motion history 122 is undertaken. If, for example, the motion exceeds a predetermined threshold, then the motion reset 122 is performed, sending a reset signal 124 to reset both the motion history 104 and the track history 110. In the case of a motion reset, the invention continues by receiving digitized video images 100, and proceeds again from block 100.

Typically operating simultaneously with the operations described above, a windowed, gradient-based horizontal edge projection (HEP) is carried out for each image 106. The vertical gradient is computed using a vertical Sobel gradient operator in a window. A non-limiting example of a typical window for 240×320 images would be a window of 50-pixel width with the same height as the image, centered horizontally with respect to the image. The gradient image is then projected (summed over) for each row to form the HEP. This technique provides a fast, reliable HEP tracking technique by using raw gradient measurements, rather than segmented edge pixels in the HEPs. Note that the vertical motion estimation 102 and the gradient-based HEP 106 may be performed in any order or simultaneously, depending on the goals of a particular application. The "no" line from the motion reset block 122 to the arrow between blocks 106 and 108 is intended to demonstrate that the gradient-based HEP operation 106 and the vertical motion estimation 102 may be performed in parallel prior to operation of the HEP segmentation and tracking module 108.

The HEP segmentation and tracking module 108 extracts the peaks in the HEP corresponding to significant horizontal edges coming from the images of overhead structures and tracks the locations of these peaks in the image across the video sequence. The result is a set of linked HEP peak locations across the image sequence, termed HEP tracks. The HEP segmentation and tracking module 108 also uses the estimated vertical motion from the vertical motion estimation block 102 to help tracking and to compensate for the track location in the image and uses the host vehicle speed to compute the traveled distance for each HEP track. The track history 110 stores this information for later use.

The HEP tracks in the track history 110 go through a first track screener block 112 before being used for parameter estimation (note that the operation of the first track screener block 112 is shown as the next action block after the HEP segmentation and tracking module 108). The first track screener block 112 implements a set of criteria to select HEP tracks. These criteria, or constraints, include: (1) Using only the tracks above a reference horizon (usually the center of the image) for parameter estimation. This eliminates most of the noisy tracks caused by distant objects and shadows cast on the ground by overhead structures and vehicles on the road. (2) Checking the results of the estimated parameters for abnormality. This is accomplished, for example, by checking the results of height and distance for negative values and ignoring the corresponding tracks, and, for the remaining tracks, checking the standard deviation of the error vector and determining whether it is a reasonably small value. This ensures that the estimated parameters fit well with the track points.

Parameter estimation, performed via an overhead distance and height estimator 114, takes the track histories of eligible HEP tracks (filtered by the first track screener 112) from the track history 110, in combination with information regarding the camera focal length 115 and the current horizon estimate 130, and computes the distance to the host vehicle and the height of the underlying overhead structure corresponding to the HEP tracks. The estimated values, along with the estimation error measures, are passed to a fusion module 116, which combines vision detections of vehicles and overhead structures with those from radar or other detection techniques in order to provide a robust obstacle detection and avoidance system. Note that the eligible HEP tracks may be received directly from the first track screener 112 or they may be received from the track history 110. The mechanics of the data transfer are considered design choices that may vary from implementation to implementation. This same idea applies to the receipt of tracks by the second track screener 118 as well as to other data flows throughout the diagram.

The second track screener 118 acts as a finer screener (filter) for the HEP tracks used in parameter estimation by allowing only certain HEP tracks to be used in combination with information regarding the camera focal length 115, for reference horizon estimation by the reference horizon estimator 120. It does so by imposing a limit on the error measure computed in the parameter estimation for each track.

After a reference horizon estimate has been generated by the reference horizon estimator 120, a determination may be made, based on an update criteria set, whether to update the reference horizon estimate 126. If the criteria for an update are not met, the new reference horizon estimate is discarded and the process begins again at the image inputting block 100. On the other hand, if the criteria are met, a reference horizon block 128 is activated, updating the active reference horizon estimate 130. The motion history 104 is also reset via resetting block 124, and the process resets, starting with the image input block 100.

Figure 2:
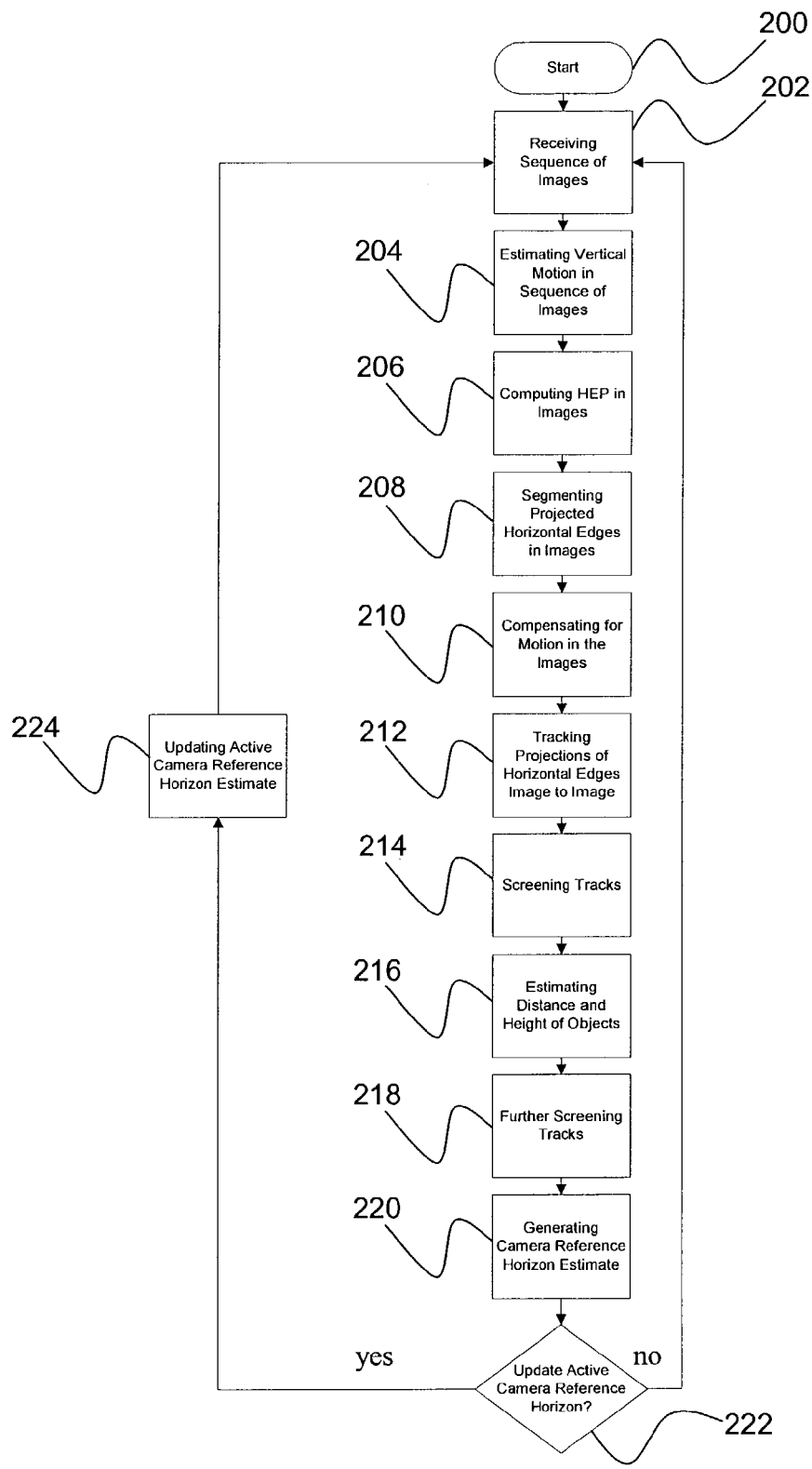
FIG. 2 is a flow diagram showing the general steps in the method of the present invention, representing a simplified version showing the operations depicted in FIG. 1.

A flow diagram showing the general steps in the method of the present invention is shown in FIG. 2. Note that the steps shown in FIG. 2 represent the operations discussed with respect to FIG. 2, but avoids detail with regard to the data flow. The steps shown in FIG. 2 depict a method for estimating a camera reference horizon $\hat{Y}_0$. After starting 200, a sequence of images is received 202. The images include projections of objects, with the projections, in turn, including horizontal edges. Next, vertical motion occurring in the sequence of images is estimated 204, and horizontal edge projections are computed 206. Note that the steps of estimating the vertical motion 204 and of computing the horizontal edge projections 206 may be performed in any order or simultaneously. After the horizontal edge projections have been computed 206, they are segmented in a step of segmenting the projected horizontal edges 208. Additionally, the motion estimate from the vertical motion estimating step 204 is used in a step for compensating for motion in the images 210. Note that during the vertical motion estimating step 204, the vertical motion estimates are stored in a motion history, from which they are recalled during the compensating step 210.

Over the sequence of images, the projections of the horizontal edges are tracked to generate tracks representing objects 212. The tracks are maintained in a active track storage by adding more data to update the active track storage from each subsequent image. The stored tracks are screened 214 (using the first track screener 112, as discussed with respect to FIG. 1) using screening criteria to produce a subset of tracks in order to enhance track reliability. The subset of tracks from the screening step 214 is used for estimating distances to the objects represented by the tracks as well as the heights of the objects represented by the tracks 216.

After the distances to and heights of the objects have been estimated, the subset of tracks is further screened by a further screening step 218, in which an error criteria is calculated for each track and selecting a subset of remaining tracks satisfying the error criteria. Finally, the tracks remaining after further screening 418 are used for generating a camera reference horizon estimate $\hat{Y}_0$ 220.

Typically, the screening criteria used in the screening step 214 causes rejection of those tracks that are below the current reference horizon. The screening criteria also includes determining a track length for each track and keeping only those tracks that have track lengths in excess of a predetermined track length threshold as well as determining the dynamic range of the tracks and keeping only those tracks that have a dynamic range exceeding a dynamic range threshold, and determining an abnormality value for each track and ignoring tracks exceeding an abnormality threshold.

After the generation of the camera reference horizon estimate $\hat{Y}_0$, additional steps may be performed for maintaining an active camera reference horizon estimate $\hat{Y}_0$. In the first additional step, a decision is made whether to update the active camera reference horizon estimate $\hat{Y}_0$ with the generated camera reference horizon estimate 222 based on the fulfillment of a criteria set. If the decision is made to update the camera reference horizon estimate $\hat{Y}_0$, then the update is performed 224. If not, the current estimate is maintained, and the method continues with the receipt of additional images 202. The criteria set used for triggering a reference horizon estimate update results in an update when (1) the longest track in the sequence of images exists over a predetermined number of images (meaning that the longest track is likely a not close enough to warrant inclusion in collision warning decisions, etc.), and (2) the longest track is within a predetermined distance from the image top. These criteria are used in combination to filter out tracks unlikely to be of interest for collision detection.

Next various "physical" aspects of the present invention will be described, followed by a more detailed description of the invention.

(3) Physical Aspects of the Present Invention

The present invention has three principal "physical" aspects. The first is an image-based horizon estimation apparatus, typically, but not limited to, a computer system operating software of in the form of a "hard-coded" instruction set. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These aspects will be described in more detail below.

Figure 3:
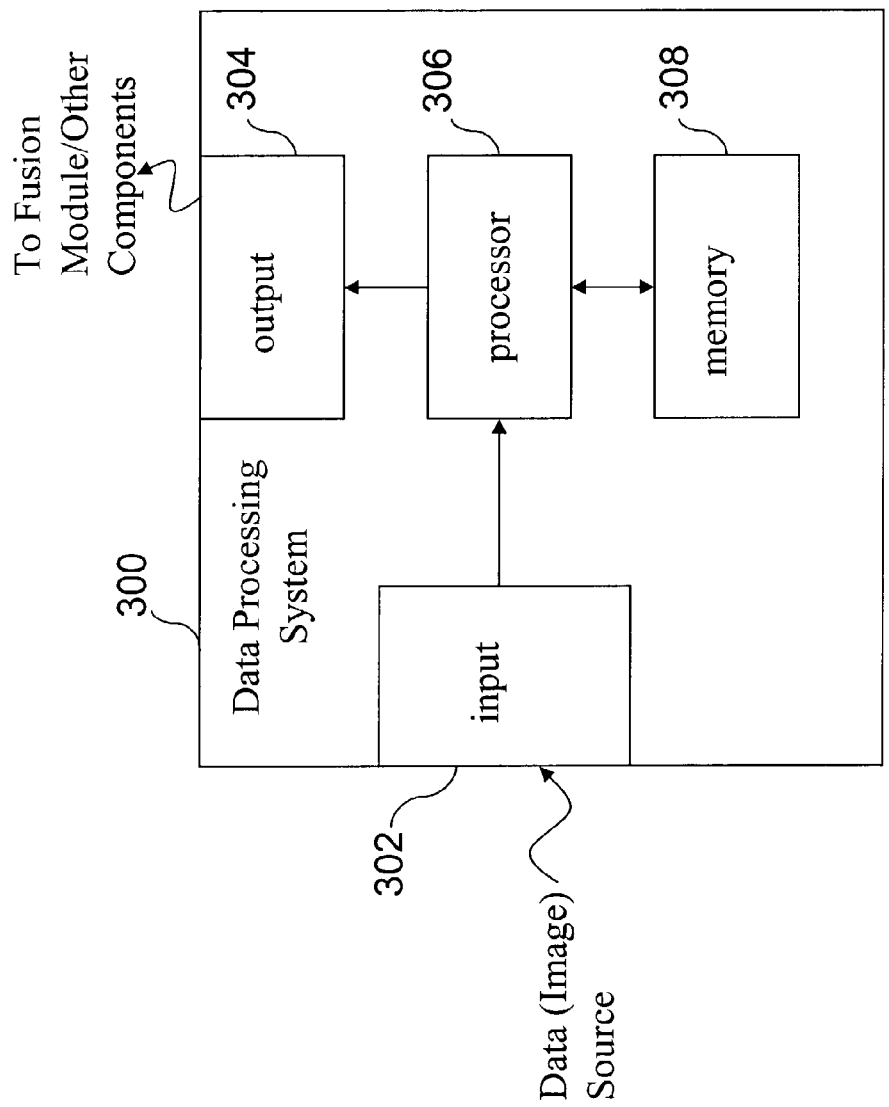
FIG. 3 is a block diagram depicting the components of a computer system used in conjunction with the present invention.

A block diagram depicting the components of a computer system used in the present invention is provided in FIG. 3. The data processing system 300 comprises an input 302 for images from an imaging device such as a CCD camera. The output 304 is connected with the processor for providing output to a user or to other devices or programs for use therein. Typically, the output is used for fusion with other information in an automotive context. The input 302 and the output 304 are both coupled with a processor 306, which may be a general-purpose computer processor or a specialized processor designed specifically for use with the present invention. The processor 306 is coupled with a memory 308 to permit storage of data and software to be manipulated by commands to the processor.

Figure 4:
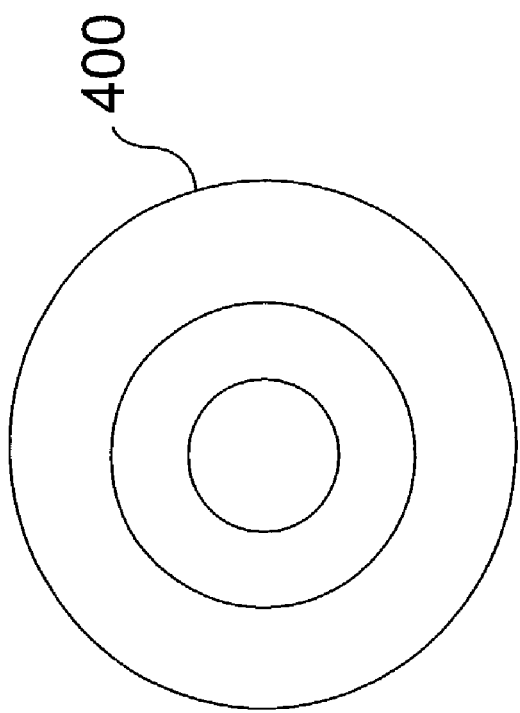
FIG. 4 is an illustrative diagram of a computer program product embodying the present invention.

An illustrative diagram of a computer program product embodying the present invention is depicted in FIG. 4. The computer program product 400 is depicted as an optical disk such as a CD or DVD. However, as mentioned previously, the computer program product generally represents computer readable code stored on any compatible computer readable medium.

(4) The Reference Horizon Estimation Technique

Now, more details of the reference horizon estimation technique are presented. A 1-dimensional imaging model may be used in a parameter estimation algorithm to describe the trajectory of HEP tracks from overhead structures:

$$y_i = \frac{fH}{Z_i} \quad i = 0, \ldots, M-1 \tag{1}$$

where $y_i$ is the track point's Y coordinate (assuming that the Y axis points up) at frame i, H is the underlying object's height (above the camera), $Z_i$ is the distance of the object to the host vehicle at frame i, and M is the number of points in the track, i.e., the length of the track. Letting $r_i$ be the track location in image row in frame i, $y_i$ can be written as $$y_i = Y_0 - r_i \tag{2}$$

where $Y_0$ is the reference horizon in the image. Also $d_i$ represents the distance the host vehicle has traveled from frame 0, with $d_0=0$ ($d_i=0$ at i=0). $Z_i$ can be expressed in terms of $d_i$ and D, the distance of the host vehicle at frame i to the object, as:

$$Z_i = D - d_i \tag{3}$$

Substituting Equations (2) and (3), above into Equation (1), the equation for the parameter estimation algorithm may be obtained, $$(Y_0-r_i)D - fH = (Y_0-r_i)d_i, \quad i=0,\ldots,M-1 \quad (4)$$

These equations can be solved using a least-squares (LSQ) approach for the unknowns of D and H. Obviously, this approach relies on having an accurate estimation of the current camera reference horizon $Y_0$ besides the camera focal length f. An error in the reference horizon will result in a bias in the estimated values for the distance and height of the overhead structure. Unlike the camera focal length, which is generally fixed and can be calibrated relatively accurately off-line, the reference horizon can change due to changes in vehicle load and other mechanical conditions that affect the vehicle pitch. Furthermore, the initial vehicle pitch, which is generally unknown, also introduces a systematic bias to the value of $Y_0$.

In the following subsections, the techniques for the estimation of the reference horizon $Y_0$ using both single and multiple HEP tracks are discussed.

(a) Single HEP Track Technique

To solve for the horizontal reference $Y_0$, Equation (4) serves as a starting point. Equation (4) represents a set of non-linear equations in the parameters D, H, and $Y_0$. It is not possible to solve directly for the parameters using a linear least-squares approach. However, if two of these equations are combined by subtracting one from the other, a linear equation is obtained in only two of the three variables:

$$(Y_0-r_i)D - (Y_0-r_j)D = (Y_0-r_i)d_i - (Y_0-r_j)d_j, \quad i,j=0,\ldots,M-1,\ i\neq j, \quad (5)$$

or $$(r_j-r_i)D + (d_j-d_i)Y_0 = (r_j d_j - r_i d_i), \quad i,j=0,\ldots,M-1,\ i\neq j \quad (6)$$

Putting the above in matrix form results in:

$$C\begin{bmatrix} D \\ Y_0 \end{bmatrix} = G, \text{ where } C = \begin{bmatrix} \vdots & \vdots \\ r_j-r_i & d_j-d_i \\ \vdots & \vdots \end{bmatrix}, G = \begin{bmatrix} \vdots \\ r_j d_j - r_i d_i \\ \vdots \end{bmatrix} \quad (7)$$

Now it is straightforward to estimate a solution to these over-constrained equations using a linear least-squares approach:

$$\begin{bmatrix} \hat{D} \\ \hat{Y}_0 \end{bmatrix} = (C^t C)^{-1} C^t G, \quad (8)$$

where $\hat{D}$ and $\hat{Y}_0$ are estimates of D and $Y_0$, respectively.

Now the size of matrix C and vector G can be decided. It is possible to have as many as M−1 independent equations in the form of Equation (6) out of the M(M−2)/2 possibilities (2 out of M). However, not all these equations are "created equal." The goal for choosing these equations is to conserve computational resources, while working with enough constraints to provide proper "resolution". An example of how to reduce the number of equations is discussed below. However, it will be apparent to one of skill in the art that a number of other techniques or criteria may be used in equation selection.

The following set of track point indices is used to select the equations in Equation (6) that will go into the least-squares solution in Equation (8):

$$i = 0, \ldots, \left\lfloor \frac{M}{2} \right\rfloor, \quad j = i + \left\lfloor \frac{M}{2} \right\rfloor, \quad (9)$$

that is, a "frame distance" of about a half of the length of the HEP track is used. Although this choice provides only about half of the possible independent equations, it is enough in most cases. In this case, the reason for choosing these equations is that the separation between i and j should be made as large as possible. This will make the difference term $(r_i - r_j)$ in Equation (6) larger, therefore reducing the relative noise level introduced by the track location $(r_i)$ measurements, which is independent of the magnitude of the actual measurement. Other sets of track point indices may be chosen for equation selection, depending on the goals of a particular implementation, as will be apparent to one of skill in the art.

(b) Multiple HEP Track Technique

Equation (8) provided one estimate for $Y_0$ for each HEP track, and these estimates must be combined to form a single estimate for $Y_0$. Alternatively, all the eligible HEP tracks may be considered together and solved for a single $Y_0$. Since the $Y_0$s in Equation (7) for different tracks are the same parameter, while the Ds are different, when equations generated according to Equation (7) are combined for different tracks, the following equations result:

$$C^{(N)} \begin{bmatrix} D \\ Y_0 \end{bmatrix} = G^{(N)}, \quad (10)$$

where $$D = [D_1 \ldots D_k \ldots D_N]^t \quad (11)$$

and $D_k$ is the distance of the host vehicle to the overhead structure for the k-th HEP track, $1 \leq k \leq N$. The matrix $C^{(N)}$ is formed by arranging the first columns of the C matrices in Equation (7) for all tracks in a staircase fashion, and by moving the second columns of the C matrices to form the last column, and filling the rest with zeros:

$$C^{(N)} = \begin{bmatrix} \vdots & & & & & \vdots \\ r_{1j}-r_{1i} & 0 & 0 & 0 & 0 & d_{1j}-d_{1i} \\ \vdots & \ddots & \vdots & \vdots & \vdots & \vdots \\ 0 & 0 & r_{kj}-r_{ki} & 0 & 0 & d_{kj}-d_{ki} \\ \vdots & \vdots & \vdots & \ddots & \vdots & \vdots \\ 0 & 0 & 0 & 0 & r_{Nj}-r_{Ni} & d_{Nj}-d_{Ni} \\ & & & & \vdots & \vdots \end{bmatrix}. \quad (12)$$

The vector $G^{(N)}$ is formed by stacking the G vectors from Equation (7) for all tracks:

$$G^{(N)} = \begin{bmatrix} \vdots \\ r_{1j}d_{1j} - r_{1i}d_{1i} \\ \vdots \\ r_{kj}d_{kj} - r_{ki}d_{ki} \\ \vdots \\ r_{Nj}d_{Nj} - r_{Ni}d_{Ni} \\ \vdots \end{bmatrix} \quad (13)$$

The least-squares solution to Equation (10) is:

$$\begin{bmatrix} \hat{D} \\ \hat{Y}_0 \end{bmatrix} = ((C^{(N)})^t C^{(N)})^{-1} (C^{(N)})^t G^{(N)} \quad (14)$$

The algorithm based on Equation (14) is termed the "global" algorithm since it uses all eligible HEP tracks.

The equations going into Equation (10) can still be selected based on Equation (9). This method, however, is not practical in the real-time environment because M (or $M_k$ for track k) is always changing (incrementing), and all of the computation involved in preparing matrices $C^{(N)}$ and $G^{(N)}$ must be repeated at every frame. Therefore it is desirable to use a fixed frame distance between j and i. That is, $$s = j - i \quad (15)$$

for all tracks. This way new equations can be continually added into matrices $C^{(N)}$ and $G^{(N)}$ as more points are gathered in each track, without starting all over at every frame. A typical value for s, for example, is 20 (frames).

Figure 5A:
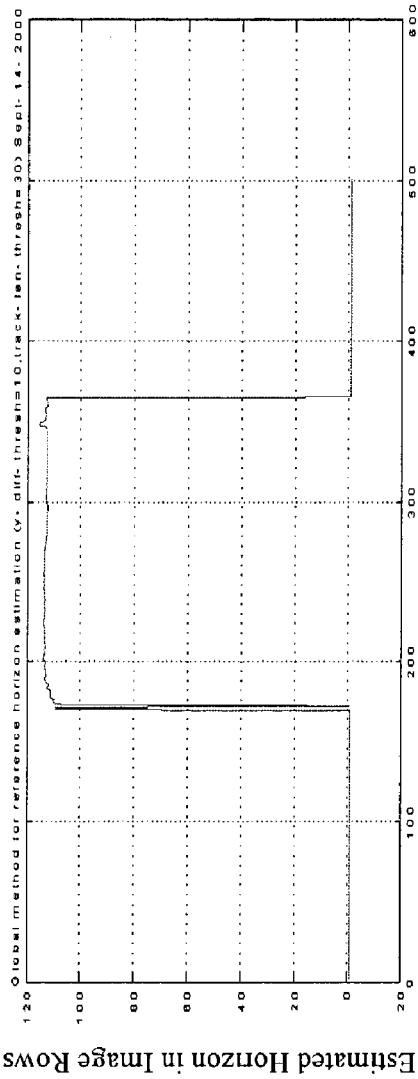
FIG. 5(a) is a graph depicting the estimated horizon in image rows over a series of images, with the vertical axis indicating the number of image rows in the estimated horizon, and with the horizontal axis indicating the image frame number.
Figure 5B:
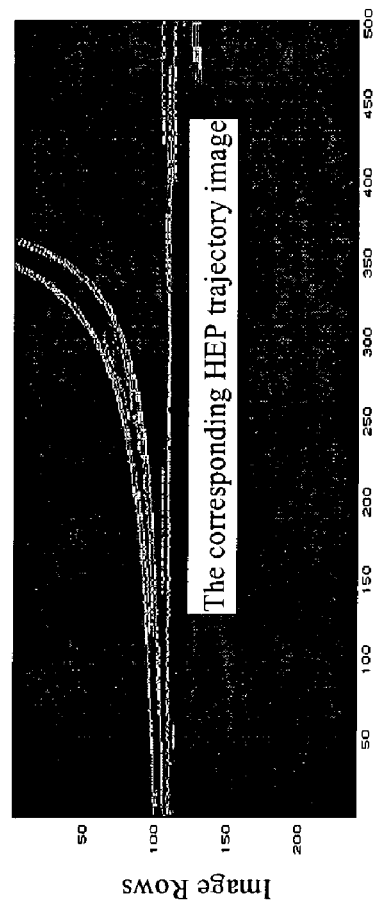
FIG. 5(b) is an image of the horizontal edge projection tracks used in the estimation.

The reference horizon estimating results, which used the global algorithm outlined here, are shown in FIG. 5. In this figure, the horizon estimation is carried out approximately between frames 180 and 375. Note that FIG. 5(a) shows the estimated reference horizon and that FIG. 5(b) is an image of the HEP tracks used in the estimation. The estimated reference horizon has a biased and noisy start, but quickly converges to a stable value. Toward the end of the HEP tracks, there is a small blip caused by the termination of some of the HEP tracks.

(5) Use of the HEP Track Techniques in an Overhead Structure Detection System

As can be seen from FIG. 5, the solution provided by Equation (14) still tends to be noisy. The reasons are the noise in the tracks and the effect of adding or removing a HEP track or tracks to or from the algorithm. The problem with adding or removing tracks can be solved or at least alleviated by use of a weighting scheme in which the weights for the newly added tracks would gradually be increased, while those being removed would gradually be decreased. In the implementation discussed in this section, the problem is solved from a system perspective because the goal of estimating the reference horizon is to obtain reliable distance and height estimates for the overhead structures. The approach is as follows. First, only the "good" HEP tracks are chosen for the reference horizon estimation. Second, a set of intuitive criteria is applied regarding when the estimated reference horizon may actually be used. Third, a set of techniques is developed to ensure that the HEP tracking, the parameter estimation, and the reference horizon estimation algorithms produce reliable results. These methods are discussed in detail in the following subsections.

(a) The Second Track Screener and Reference Horizon Updating

It is important to ensure that the tracks used for reference horizon estimation are good tracks in the sense that the tracks fit the desired mathematical model and contain minimal noise. This is achieved by using the second track screener 118, as was shown in FIG. 1. In the least-squares (LSQ) parameter estimation block, also known as the overhead distance and height estimator 114, a root-mean-squared-error (RMSE) is computed for each track. The role of second track screener 118 is to examine the RMSEs of the tracks to ensure that the track trajectory fits well with the model for the parameter estimation algorithm and, hence, will provide good results with the reference horizon estimation algorithm. To do this, the second track screener 118 imposes a maximum RMSE on all tracks going into the reference horizon estimation algorithm.

In this way, the global algorithm generally produces very good estimates for the reference horizon. Next, given that good estimates for the reference horizon exist, they must be put to use. One way of using the reference horizon estimates is to use the newly estimated value in the next frame immediately in the overhead distance and height estimator 114 (the LSQ parameter estimation block). However, doing so runs the risk of producing unstable parameter estimation output (due to their sensitivity to changes in $Y_0$). A more cautious approach is taken in this implementation, with the reference horizon being updated only when the following criteria are met:

The longest HEP track is longer than a certain threshold (e.g. 100 frames)

The longest HEP track is near the top of the image

The purpose of the first criterion above is to avoid short and unreliable tracks. The second criterion is designed to seize the most reliable estimate of the reference horizon. When a HEP track reaches near the top of the image, the track has arrived at its longest possible length. And that is when the algorithm can benefit most from the HEP track because the longer the track is, the tighter the constraint the track has on the model.

In this scheme, updating $Y_0$ means replacing the old value with the newly estimated value. However, there are many other ways to update the value of $Y_0$ that the system uses for parameter estimation. One possibility is to use weighted average based on certain error measurements, noise measurements, or track length measurements. It is also possible to apply Kalman filtering or other filtering techniques directly on the estimated $Y_0$.

(b) HEP Tracking Reset and Motion Reset

Once $Y_0$ has been updated 128, the parameter estimation can no longer continue. This is because parameter estimation depends on the value of $Y_0$. If $Y_0$ is changed, there is likely a discontinuity in the output of parameter estimation due to the change in $Y_0$. This situation may not be optimal for other modules or systems that use this information (such as the fusion module 116). In this case, it is desirable to terminate all HEP tracks and start anew when $Y_0$ is updated. This is called HEP tracking reset. Resetting all tracks may seem an extreme measure to take to the overall system (e.g., the fusion module 116 will suddenly loose overhead track information). In reality, though, due to the criteria outlined above, when a HEP tracking reset occurs, the host vehicle will have been very close to the overhead structure. Therefore any decision that must be made by an obstacle avoidance system should have already been made.

Another situation when HEP tracking reset happens is when there is a change in road slope. This instance of the parameter estimation algorithm assumes that the host vehicle is traveling on a flat road. However, when the vehicle goes from a flat section of the road into a down- or up-hill slope, or vice versa, this assumption is violated and the parameters estimated will not be accurate. Such transitions should be detected, and the current HEP tracks should be abandoned by resetting. Once a road slope transition is detected, all current HEP tracks are reset, effectively segmenting potentially very long HEP tracks into pieces corresponding to flat road sections. This not only helps parameter estimation, it also ensures that the model and assumptions for the reference horizon estimation are still valid.

One approach to road slope transition detection is to monitor the cumulative motion offset. The cumulative motion offset is the amount of vertical motion estimated at the current image frame relative to a certain reference frame in the past, and is used to perform motion compensation for the HEP tracks and tracking. If the road surface is flat, this offset value should stay relatively small, indicating that the vertical motion is mainly caused by uneven road surface.

When the host vehicle goes from a flat road section into a section with a different slope, or a section with changing slope, the absolute value of the cumulative motion offset will be high and stay high. A simple threshold measured in image pixels may be applied to the absolute cumulative motion offset in order to decide if a slope transition has occurred. This method may be further improved, for example, by using the past history of the cumulative motion offset (the motion history 104) to determine the road slope transition more accurately and more robustly. When HEP track reset occurs, the motion history 104 is also reset, and the cumulative motion offset is set to zero.

(6) Real-Time Implementation Example

Techniques that implement both the parameter estimation and the global reference horizon estimation suitable for real-time execution are discussed in this section. These techniques emphasize the theme of incremental updating to save computation needed to accomplish the tasks. In the following subsections, the design of incremental parameter estimation and the global reference horizon estimation are discussed. The technique for parameter estimation is discussed first since the RMSE is needed for screening tracks used for the reference horizon estimation.

(a) LSQ Parameter (Overhead Distance and Height) Estimation

Equation (4) for the LSQ parameter estimation may be written as a matrix as follows:

$$A\begin{bmatrix} D \\ H \end{bmatrix} = B, \quad (16)$$

where matrix A (M by 2) and the column vector B (size M) are made up of the coefficients of Equation (4):

$$A = \begin{bmatrix} Y_0 - r_1 & -f \\ \vdots & \vdots \\ Y_0 - r_i & -f \\ \vdots & \vdots \\ Y_0 - r_M & -f \end{bmatrix}, B = \begin{bmatrix} (Y_0 - r_1)d_1 \\ \vdots \\ (Y_0 - r_i)d_i \\ \vdots \\ (Y_0 - r_M)d_M \end{bmatrix}. \quad (17)$$

To compute the LSQ solutions for D and H, Equation (16) is multiplied by the transposition of matrix A, and the resulting set of linear equation is solved using Gaussian elimination:

$$A^t A \begin{bmatrix} \hat{D} \\ \hat{H} \end{bmatrix} = A^t B. \quad (18)$$

Next, equations for computing the matrices $A^tA$ and $A^tB$ are derived incrementally. From Equation (17), $$A^t A = \begin{bmatrix} \sum_i (Y_0 - r_i)^2 & -f\sum_i (Y_0 - r_i) \\ -f\sum_i (Y_0 - r_i) & Mf^2 \end{bmatrix} \equiv \begin{bmatrix} U & V \\ V & Mf^2 \end{bmatrix}, \text{ and} \quad (19)$$

$$A^t B = \begin{bmatrix} \sum_i d_i(Y_0 - r_i)^2 \\ -f\sum_i d_i(Y_0 - r_i) \end{bmatrix} \equiv \begin{bmatrix} W \\ Z \end{bmatrix}, \text{ where} \quad (20)$$

$$\left. \begin{aligned} U &= \sum_i (Y_0 - r_i)^2 = \sum_i r_i^2 - 2Y_0 \sum_i r_i + MY_0 \\ V &= -f\sum_i (Y_0 - r_i) = f\left(\sum_i r_i - MY_0\right) \\ W &= \sum_i d_i(Y_0 - r_i)^2 = Y_0^2 \sum_i d_i^2 - 2Y_0 \sum_i d_i r_i + \sum_i d_i r_i^2 \\ Z &= -f\sum_i d_i(Y_0 - r_i) = f\left(\sum_i d_i r_i - Y_0 \sum_i d_i\right) \end{aligned} \right\} \quad (21)$$

All of the summations are for i from 1 to M. As can be seen, if $Y_0$ is fixed and known, then the terms U, V, W and Z in the matrices $A^tA$ and $A^tB$ can be updated incrementally directly as the HEP track length increases from M to M+1. Otherwise, if $Y_0$ is not known or it may change later, then the components of these terms can be updated incrementally, and the terms themselves can be computed once $Y_0$ is known. Additionally, it is noteworthy that there are many common terms in the expressions of U, V, W, and Z. Therefore only one copy of these terms need be kept to avoid duplicate computations.

The RMSE for Equation (18) is:

$$E_{\text{RMS}} = \sqrt{\frac{1}{M} E^t E}, \text{ where } E = \left(A\begin{bmatrix} \hat{D} \\ \hat{H} \end{bmatrix} - B\right). \quad (22)$$

Letting $P = [\hat{D} \ \hat{H}]^t$, and expanding the term $E^tE$ generates $$E^tE = P^tA^tAP - 2P^tA^tB + B^tB. \quad (23)$$

Incremental updating formulas already exist for $A^tA$ and $A^tB$ (Equation (19) and Equation (20)). From Equation (17), $B^tB$ can be written as:

$$B^t B = \sum_i (Y_0 - r_i)^2 d_i^2 = Y_0^2 \sum_i d_i^2 - 2Y_0 \sum_i r_i d_i^2 + \sum_i r_i^2 d_i^2 \quad (24)$$

Thus, $B^tB$ can also be computed incrementally.

(b) Reference Horizon Estimation

The LSQ solution (Equation (14)) for the reference horizon estimation can be obtained by applying Gaussian elimination to the following equations:

$$((C^{(N)})^t C^{(N)}) \begin{bmatrix} \hat{D} \\ \hat{Y}_0 \end{bmatrix} = (C^{(N)})^t G^{(N)} \quad (25)$$

As before, the equations for the matrices $(C^{(N)})^t C^{(N)}$ and $(C^{(N)})^t G^{(N)}$ can be written as follows:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and} \quad (26)$$

$$(C^{(N)})^t G^{(N)} = [S_1 \cdots S_k \cdots S_N \; T]^t, \text{ where} \quad (27)$$

$$\left. \begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^N q_k, \; q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{kj} - r_{kj} d_{ki}) \\ T &= \sum_{k=1}^N t_k, \; t_k = \sum_{(i,j) \in \Theta_k} (d_{kj} - d_{ki})(r_{kj} d_{kj} - r_{kj} d_{ki}) \end{aligned} \right\} \begin{aligned} k &= 1, \ldots, N \\ \Theta_k &= \{(i,j) \mid j = i+s, 1 \le i, j \le M_k\} \end{aligned} \quad (28)$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{k1}=0$ for all k;

$d_{ki}$ is a distance traveled by a vehicle at the ith frame of the kth track relative to the first frame, with $d_{k1}=0$ for all k; and where the terms $R_k$, $P_k$, $q_k$, $S_k$, and $t_k$ are computed incrementally as new track points are added and new pairs of $\{i,j\}$ become part of the index set $\Theta_k$.

In the above equations, the index set $\Theta_k$ includes all possible pairings of $\{i,j\}$ that are separated by a fixed number of frames s (Equation (15)). As can be seen here, the terms $R_k$, $P_k$, $q_k$, $S_k$, and $t_k$ can all be computed incrementally as new HEP track points are added and new pairs of $\{i,j\}$ become part of the index set $\Theta_k$.

What is claimed is:

1. A method for generating a camera reference horizon estimate $\hat{Y}_0$, the method comprising steps of:

receiving a sequence of images including projections of objects thereon, with projections including horizontal edges;

estimating vertical motion occurring in the sequence of images and storing the estimated vertical motion as a motion history;

computing the projection of the horizontal edges in the images;

segmenting the projected horizontal edges in the images;

compensating for motion in the images using the estimated vertical motion from the motion history;

tracking the projections of the horizontal edges from image to image to generate tracks representing objects and maintaining an active track storage by adding more data to update the active track storage from each subsequent image;

screening the generated tracks using screening criteria to produce a subset of tracks in order to enhance track reliability;

receiving the subset of tracks from the screening step and estimating distances to the objects represented by the tracks and heights of the objects represented by the tracks;

further screening the subset of tracks by calculating an error criteria for each track and selecting a subset of remaining tracks satisfying the error criteria; and generating a camera reference horizon estimate $\hat{Y}_0$ from the remaining tracks.

2. A method for generating a camera reference horizon estimate $\hat{Y}_0$, as set forth in claim 1, wherein the screening criteria used in the screening step include rejecting those tracks that are below the current reference horizon; determining a track length for each track and keeping only those tracks that have track lengths in excess of a predetermined track length threshold; determining the dynamic range of the tracks and keeping only those tracks that have a dynamic range exceeding a dynamic range threshold; and determining an abnormality value for each track and ignoring tracks exceeding an abnormality threshold.

3. A method for generating a camera reference horizon estimate $\hat{Y}_0$, as set forth in claim 2, wherein in the step of further screening the subset of tracks, the error criteria used includes calculating a root-mean-squared fitting error for each track using the estimated distance and height, and excluding those tracks having a root-mean-squared fitting error exceeding a predetermined threshold.

4. A method for generating a camera reference horizon estimate $\hat{Y}_0$, as set forth in claim 3, further comprising steps of:
  maintaining an active camera reference horizon estimate $\hat{Y}_0$; and
  updating the active camera reference horizon estimate $\hat{Y}_0$ with the generated camera reference horizon estimate based on the fulfillment of a criteria set.

5. A method for generating a camera reference horizon estimate $\hat{Y}_0$, as set forth in claim 4, wherein the images include image tops, and wherein in the step of updating the active camera reference horizon estimate $\hat{Y}_0$ is triggered based on the fulfillment of the criteria set including:
  when a longest track exists in a number of images in the sequence of images, where the number exceeds a predetermined threshold; and
  when the longest track is within a predetermined distance from an image top.

6. A method for generating a camera reference horizon estimate $\hat{Y}_0$, as set forth in claim 5, wherein the step of estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i d_i (Y_0 - r_i)^2 \\ -f \sum_i d_i (Y_0 - r_i) \end{bmatrix} \equiv \begin{bmatrix} W \\ Z \end{bmatrix}, \text{ where}$$

$$\left. \begin{aligned} U &= \sum_i (Y_0 - r_i)^2 = \sum_i r_i^2 - 2Y_0 \sum_i r_i + MY_0 \\ V &= -f \sum_i (Y_0 - r_i) = f\left( \sum_i r_i - MY_0 \right) \\ W &= \sum_i d_i (Y_0 - r_i)^2 = Y_0^2 \sum_i d_i^2 - 2Y_0 \sum_i d_i r_i + \sum_i d_i r_i^2 \\ Z &= -f \sum_i d_i (Y_0 - r_i) = f\left( \sum_i d_i r_i - Y_0 \sum_i d_i \right) \end{aligned} \right\}, \text{ and}$$

where the sum $\sum_i$ is for $i = 1$ to $M$;

whereby the matrices $A^t A$ and $A^t B$ can be updated incrementally as the HEP track length increases from M to M+1.

7. A method for generating a camera reference horizon estimate $\hat{Y}_0$, as set forth in claim 6, wherein in the step of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [\, S_1 \; \cdots \; S_k \; \cdots \; S_N \; T \,]^t, \text{ where}$$

-continued $$R_k = \sum_{(i,j)\in\Theta_k} (r_{kj} - r_{ki})^2$$

$$P_k = \sum_{(i,j)\in\Theta_k} (r_{kj} - r_{ki})(d_{kj} - d_{ki})$$

$$Q = \sum_{k=1}^{N} q_k, \; q_k = \sum_{(i,j)\in\Theta_k} (d_{kj} - d_{ki})^2$$

$$S_k = \sum_{(i,j)\in\Theta_k} (r_{kj} - r_{ki})(r_{kj}d_{kj} - r_{kj}d_{ki})$$

$$T = \sum_{k=1}^{N} t_k, \; t_k = \sum_{(i,j)\in\Theta_k} (d_{kj} - d_{ki})(r_{kj}d_{kj} - r_{kj}d_{ki})$$

$$k = 1, \ldots, N$$
$$\Theta_k = \{(i, j) \mid j = i+s, 1 \leq i, j \leq M_k\}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a ith image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kl}=0$ for all k;

$d_{ki}$ is a distance traveled by a vehicle at the ith frame of the kth track relative to the first frame, with $d_{kl}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

8. A method for generating a camera reference horizon estimate $\hat{Y}_0$, as set forth in claim 1, wherein in the step of further screening the subset of tracks, the error criteria used includes calculating a root-mean-squared fitting error for each track using the estimated distance and height, and excluding those tracks having a root-mean-squared fitting error exceeding a predetermined threshold.

9. A method for generating a camera reference horizon estimate $\hat{Y}_0$, as set forth in claim 8, further comprising steps of:

maintaining an active camera reference horizon estimate $\hat{Y}_0$; and updating the active camera reference horizon estimate $\hat{Y}_0$ with the generated camera reference horizon estimate based on the fulfillment of a criteria set.

10. A method for generating a camera reference horizon estimate $\hat{Y}_0$, asset forth in claim 9, wherein the images include image tops, and wherein in the step of updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

11. A method for generating a camera reference horizon estimate $\hat{Y}_0$, as set forth in claim 10, wherein the step of estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^tA$ and $A^tB$ are:

$$A^t A = \begin{bmatrix} \sum_i (Y_0 - r_i)^2 & -f\sum_i (Y_0 - r_i) \\ -f\sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i d_i(Y_0 - r_i)^2 \\ -f\sum_i d_i(Y_0 - r_i) \end{bmatrix} \equiv \begin{bmatrix} W \\ Z \end{bmatrix}, \text{ where}$$

$$U = \sum_i (Y_0 - r_i)^2 = \sum_i r_i^2 - 2Y_0 \sum_i r_i + MY_0$$

$$V = -f\sum_i (Y_0 - r_i) = f\left(\sum_i r_i - MY_0\right)$$

$$W = \sum_i d_i(Y_0 - r_i)^2 = Y_0^2 \sum_i d_i^2 - 2Y_0 \sum_i d_i r_i + \sum_i d_i r_i^2$$

$$Z = -f\sum_i d_i(Y_0 - r_i) = f\left(\sum_i d_i r_i - Y_0 \sum_i d_i\right)$$

, and where the sum $\sum_i$ is for $i = 1$ to $M$;

whereby the matrices $A^tA$ and $A^tB$ can be updated incrementally as the HEP track length increases from M to M+1.

12. A method for generating a camera reference horizon estimate $\hat{Y}_0$, as set forth in claim 11, wherein in the step of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [\, S_1 \;\; \cdots \;\; S_k \;\; \cdots \;\; S_N \;\; T \,]^t, \text{ where}$$

$$\left.\begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^N q_k, \;\; q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{ki} - r_{kj} d_{ki}) \\ T &= \sum_{k=1}^N t_k, \;\; t_k = \sum_{(i,j) \in \Theta_k} (d_{kj} - d_{ki})(r_{kj} d_{kj} - r_{kj} d_{ki}) \end{aligned}\right\} \begin{array}{l} k = 1, \dots, N \\ \Theta_k = \{(i,j) \mid j = i+s, \; 1 \leq i, j \leq M_k\} \end{array}$$

where:
i and j are matrix index variables,
$\Theta_k$ is an index set including all possible pairings of $\{i,j\}$ that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{kl}=0$ for all k;
$d_{ki}$ is a distance traveled by a vehicle at the ith frame of the kth track relative to the first frame, with $d_{kl}=0$ for all k; and
whereby the terms $R_k$, $P_k$, $q_k$, $S_k$, and $t_k$ are computed incrementally as new track points are added and new pairs of $\{i,j\}$ become part of the index set $\Theta_k$.

13. A method for generating a camera reference horizon estimate $\hat{Y}_0$, as set forth in claim 1, further comprising steps of:
maintaining an active camera reference horizon estimate $\hat{Y}_0$; and
updating the active camera reference horizon estimate $\hat{Y}_0$ with the generated camera reference horizon estimate based on the fulfillment of a criteria set.

14. A method for generating a camera reference horizon estimate $\hat{Y}_0$, as set forth in claim 13, wherein the images include image tops, and wherein in the step of updating the active camera reference horizon estimate $\hat{Y}_0$ is triggered based on the fulfillment of the criteria set including:

when a longest track exists in a number of images in the sequence of images, where the number exceeds a predetermined threshold; and
when the longest track is within a predetermined distance from an image top.

15. A method for generating a camera reference horizon estimate $\hat{Y}_0$, as set forth in claim 14, wherein the step of estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & M f^2 \end{bmatrix} \equiv \begin{bmatrix} U & V \\ V & M f^2 \end{bmatrix}, \text{ and}$$

$$A^t B = \begin{bmatrix} \sum_i (d_i (Y_0 - r_i))^2 \\ -f \sum_i d_i (Y_0 - r_i) \end{bmatrix} \equiv \begin{bmatrix} W \\ Z \end{bmatrix}, \text{ where}$$

-continued $$U = \sum_i (Y_0 - r_i)^2 = \sum_i r_i^2 - 2Y_0 \sum_i r_i + MY_0$$

$$V = -f \sum_i (Y_0 - r_i) = f\left(\sum_i r_i - MY_0\right)$$

$$W = \sum_i (d_i(Y_0 - r_i))^2 = Y_0^2 \sum_i d_i^2 - 2Y_0 \sum_i d_i r_i + \sum_i d_i r_i^2$$

$$Z = -f \sum_i d_i(Y_0 - r_i) = f\left(\sum_i d_i r_i - Y_0 \sum_i d_i\right)$$

, and where
the sum $\Sigma_i$ is for i=1 to M;
f is a camera focal length,
M is a length of a track,
$r_i$ is a track location in an image,
$Y_0$ is the camera horizon, and
$d_i$ is the distance a vehicle hosting the camera has traveled since the first image;
whereby the matrices $A^tA$ and $A^tB$ can be updated incrementally as the HEP track length increases from M to M+1.

16. A method for generating a camera reference horizon estimate $\hat{Y}_0$, as set forth in claim 15, wherein in the step of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \ T]^t, \text{ where}$$

$$R_k = \sum_{(i,j) \in \Theta_k} (r_{kj} - r_{ki})^2$$

$$P_k = \sum_{(i,j) \in \Theta_k} (r_{kj} - r_{ki})(d_{kj} - d_{ki})$$

$$Q = \sum_{k=1}^{N} q_k, \ q_k = \sum_{(i,j) \in \Theta_k} (d_{kj} - d_{ki})^2$$

$$S_k = \sum_{(i,j) \in \Theta_k} (r_{kj} - r_{ki})(r_{kj} d_{kj} - r_{kj} d_{ki})$$

$$T = \sum_{k=1}^{N} t_k, \ t_k = \sum_{(i,j) \in \Theta_k} (d_{kj} - d_{ki})(r_{kj} d_{kj} - r_{kj} d_{ki})$$

$k = 1, \ldots, N$
$\Theta_k = \{(i, j) \mid j = i + s, \ 1 <= i, \ j <= M_k\}$ where:
i and j are matrix index variables,
$\Theta_k$ is an index set including all possible pairings of $\{i,j\}$ that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{k1}$=0 for all k;
$d_{ki}$ is a distance traveled by a vehicle at the ith frame of the kth track relative to the first frame, with $d_{k1}$=0 for all k; and
whereby the terms $R_k$, $P_k$, $q_k$, $S_k$, and $t_k$ are computed incrementally as new track points are added and new pairs of $\{i,j\}$ become part of the index set $\Theta_k$.

17. A method for generating a camera reference horizon estimate $\hat{Y}_0$, as set forth in claim 1, wherein the step of estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^tA$ and $A^tB$ are:

$$A^tA = \begin{bmatrix} \sum_i (Y_0 - r_i)^2 & -f\sum_i(Y_0 - r_i) \\ -f\sum_i(Y_0 - r_i) & Mf^2 \end{bmatrix} \equiv \begin{bmatrix} U & V \\ V & Mf^2 \end{bmatrix}, \text{ and}$$

$$A^tB = \begin{bmatrix} \sum_i (d_i(Y_0 - r_i))^2 \\ -f\sum_i d_i(Y_0 - r_i) \end{bmatrix} \equiv \begin{bmatrix} W \\ Z \end{bmatrix}, \text{ where}$$

-continued $$U = \sum_i (Y_0 - r_i)^2 = \sum_i r_i^2 - 2Y_0 \sum_i r_i + MY_0$$

$$V = -f\sum_i(Y_0 - r_i) = f\left(\sum_i r_i - MY_0\right)$$

$$W = \sum_i (d_i(Y_0 - r_i))^2 = Y_0^2 \sum_i d_i^2 - 2Y_0 \sum_i d_i r_i + \sum_i d_i r_i^2$$

$$Z = -f\sum_i d_i(Y_0 - r_i) = f\left(\sum_i d_i r_i - Y_0 \sum_i d_i\right)$$

where
the sum $\Sigma_i$ is for i=1 to M;
f is a camera focal length,
M is a length of a track,
$r_i$ is a track location in an image,
$Y_0$ is the camera horizon, and
$d_i$ is the distance a vehicle hosting the camera has traveled since the first image;
whereby the matrices $A^tA$ and $A^tB$ can be updated incrementally as the HEP track length increases from M to M+1.

18. A method for generating a camera reference horizon estimate $\hat{Y}_0$, as set forth in claim 17, wherein in the step of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \; T]^t, \text{ where}$$

$$\left.\begin{aligned} R_k &= \sum_{(i,j)\in\Theta_k} (r_{kj} - r_{ki})^2 \\ P_k &= \sum_{(i,j)\in\Theta_k} (r_{kj} - r_{ki})(d_{kj} - d_{ki}) \\ Q &= \sum_{k=1}^N q_k, \; q_k = \sum_{(i,j)\in\Theta_k} (d_{kj} - d_{ki})^2 \\ S_k &= \sum_{(i,j)\in\Theta_k} (r_{kj} - r_{ki})(r_{kj}d_{kj} - r_{kj}d_{ki}) \\ T &= \sum_{k=1}^N t_k, \; t_k = \sum_{(i,j)\in\Theta_k} (d_{kj} - d_{ki})(r_{kj}d_{kj} - r_{kj}d_{ki}) \end{aligned}\right\} \begin{aligned} k &= 1, \ldots, N \\ \Theta_k &= \{(i,j) \mid j = i+s, \; 1 \le i, \; j \le M_k\} \end{aligned}$$

where:
i and j are matrix index variables,
$\Theta_k$ is an index set including all possible pairings of $\{i,j\}$ that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{ki}=0$ for all k;
$d_{ki}$ is a distance traveled by a vehicle at the ith frame of the kth track relative to the first frame, with $d_{ki}=0$ for all k; and
whereby the terms $R_k$, $P_k$, $q_k$, $S_k$, and $t_k$ are computed incrementally as new track points are added and new pairs of $\{i,j\}$ become part of the index set $\Theta_k$.

19. A method for generating a camera reference horizon estimate $\hat{Y}_0$, as set forth in claim 1, wherein in the step of generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \ \cdots \ S_k \ \cdots \ S_N \ T]^t, \text{ where}$$

$$\left. \begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^{N} q_k, \ q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{kj} - r_{kj} d_{ki}) \\ T &= \sum_{k=1}^{N} t_k, \ t_k = \sum_{(i,j) \in \Theta_k} (d_{kj} - d_{ki})(r_{kj} d_{kj} - r_{kj} d_{ki}) \end{aligned} \right\} \begin{aligned} & k = 1, \ldots, N \\ & \Theta_k = \{(i,j) \mid j = i + s, \ 1 <= i, \ j <= M_k\} \end{aligned}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kl}=0$ for all k;

$d_{ki}$ is a distance traveled by a vehicle at the ith frame of the kth track relative to the first frame, with $d_{kl}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

20. A computer program product for generating a camera reference horizon estimate $\hat{Y}_0$, the computer program product comprising means, residing on a computer-readable medium, for:

receiving a sequence of images including projections of objects thereon, with projections including horizontal edges;

estimating vertical motion occurring in the sequence of images and storing the estimated vertical motion as a motion history;

computing the projection of the horizontal edges in the images;

segmenting the projected horizontal edges in the images;

compensating for motion in the images using the estimated vertical motion from the motion history;

tracking the projections of the horizontal edges from image to image to generate tracks representing objects and maintaining an active track storage by adding more data to update the active track storage from each subsequent image;

screening the generated tracks using screening criteria to produce a subset of tracks in order to enhance track reliability;

receiving the subset of tracks from the means for screening and estimating distances to the objects represented by the tracks and heights of the objects represented by the tracks;

further screening the subset of tracks by calculating an error criteria for each track and selecting a subset of remaining tracks satisfying the error criteria; and generating a camera reference horizon estimate $\hat{Y}_0$ from the remaining tracks.

21. A computer program product for generating a camera reference horizon estimate $\hat{Y}_0$, as set forth in claim 20, wherein the screening criteria used by the means for screening include rejecting those tracks that are below the current reference horizon; determining a track length for each track and keeping only those tracks that have track lengths in excess of a predetermined track length threshold; determining the dynamic range of the tracks and keeping only those tracks that have a dynamic range exceeding a dynamic range threshold; and determining an abnormality value for each track and ignoring tracks exceeding an abnormality threshold.

22. A computer program product for generating a camera reference horizon estimate $\hat{Y}_0$, as set forth in claim 21, wherein in the means for further screening the subset of tracks, the error criteria used includes calculating a root-mean-squared fitting error for each track using the estimated distance and height, and excluding those tracks having a root-mean-squared fitting error exceeding a predetermined threshold.

23. A computer program product for generating a camera reference horizon estimate $\hat{Y}_0$, as set forth in claim 22, further comprising means for:

maintaining an active camera reference horizon estimate $\hat{Y}_0$; and updating the active camera reference horizon estimate $\hat{Y}_0$ with the generated camera reference horizon estimate based on the fulfillment of a criteria set.

24. A computer program product for generating a camera reference horizon estimate $\hat{Y}_0$, as set forth in claim 23, wherein the images include image tops, and wherein in the means for updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

25. A computer program product for generating a camera reference horizon estimate $\hat{Y}_0$, as set forth in claim 24, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i (d_i(Y_0 - r_i))^2 \\ -f \sum_i d_i(Y_0 - r_i) \end{bmatrix} \equiv \begin{bmatrix} W \\ Z \end{bmatrix}, \text{ where}$$

$$\left. \begin{array}{l} U = \sum_i (Y_0 - r_i)^2 = \sum_i r_i^2 - 2Y_0 \sum_i r_i + MY_0 \\ V = -f \sum_i (Y_0 - r_i) = f \left( \sum_i r_i - MY_0 \right) \\ W = \sum_i (d_i(Y_0 - r_i))^2 = Y_0^2 \sum_i d_i^2 - 2Y_0 \sum_i d_i r_i + \sum_i d_i r_i^2 \\ Z = -f \sum_i d_i(Y_0 - r_i) = f \left( \sum_i d_i r_i - Y_0 \sum_i d_i \right) \end{array} \right\}, \text{ and}$$

where
the sum $\Sigma_i$ is for i=1 to M;
f is a camera focal length,
M is a length of a track,
$r_i$ is a track location in an image,
$Y_0$ is the camera horizon, and $d_i$ is the distance a vehicle hosting the camera has traveled since the first image;

whereby the matrices $A^t A$ and $A^t B$ can be updated incrementally as the HEP track length increases from M to M+1.

26. A computer program product for generating a camera reference horizon estimate $\hat{Y}_0$, as set forth in claim 25, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \ \cdots \ S_k \ \cdots \ S_N \ T]^t, \text{ where}$$

$$\left. \begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^N q_k, \ q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{kj} - r_{kj} d_{ki}) \\ T &= \sum_{k=1}^N t_k, \ t_k = \sum_{(i,j) \in \Theta_k} (d_{kj} - d_{ki})(r_{kj} d_{kj} - r_{kj} d_{ki}) \end{aligned} \right\} \begin{aligned} k &= 1, \ldots, N \\ \Theta_k &= \{(i,j) \mid j = i + s, 1 <= i, j <= M_k\} \end{aligned}$$

where:

i and j are matrix index variables, $\Theta_k$ is an index set including all possible pairings of {i,j} that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{ki}=0$ for all k;

$d_{ki}$ is a distance traveled by a vehicle at the ith frame of the kth track relative to the first frame, with $d_{ki}=0$ for all k; and whereby the terms $R_k$, $P_k$, $q_k$, $S_k$, and $t_k$ are computed incrementally as new track points are added and new pairs of {i,j} become part of the index set $\Theta_k$.

27. A computer program product for generating a camera reference horizon estimate $\hat{Y}_0$, as set forth in claim 20, wherein in the means for further screening the subset of tracks, the error criteria used includes calculating a root-mean-squared fitting error for each track using the estimated distance and height, and excluding those tracks having a root-mean-squared fitting error exceeding a predetermined threshold.

28. A computer program product for generating a camera reference horizon estimate $\hat{Y}_0$, as set forth in claim 27, further comprising means for:

maintaining an active camera reference horizon estimate $\hat{Y}_0$; and updating the active camera reference horizon estimate $\hat{Y}_0$ with the generated camera reference horizon estimate based on the fulfillment of a criteria set.

29. A computer program product for generating a camera reference horizon estimate $\hat{Y}_0$, as set forth in claim 28, wherein the images include image tops, and wherein in the means for updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

30. A computer program product for generating a camera reference horizon estimate $\hat{Y}_0$, as set forth in claim 29, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & M f^2 \end{bmatrix} \equiv \begin{bmatrix} U & V \\ V & M f^2 \end{bmatrix}, \text{ and}$$

$$A^t B = \begin{bmatrix} \sum_i (d_i (Y_0 - r_i))^2 \\ -f \sum_i d_i (Y_0 - r_i) \end{bmatrix} \equiv \begin{bmatrix} W \\ Z \end{bmatrix}, \text{ where}$$

-continued $$U = \sum_i (Y_0 - r_i)^2 = \sum_i r_i^2 - 2Y_0 \sum_i r_i + MY_0$$

$$V = -f \sum_i (Y_0 - r_i) = f\left(\sum_i r_i - MY_0\right)$$

$$W = \sum_i (d_i(Y_0 - r_i))^2 = Y_0^2 \sum_i d_i^2 - 2Y_0 \sum_i d_i r_i + \sum_i d_i r_i^2$$

$$Z = -f \sum_i d_i(Y_0 - r_i) = f\left(\sum_i d_i r_i - Y_0 \sum_i d_i\right)$$

, and where
the sum $\Sigma_i$ is for i=1 to M;
f is a camera focal length,
M is a length of a track,
$r_i$ is a track location in an image,
$Y_0$ is the camera horizon, and
$d_i$ is the distance a vehicle hosting the camera has traveled since the first image;
whereby the matrices $A'A$ and $A'B$ can be updated incrementally as the HEP track length increases from M to M+1.

31. A computer program product for generating a camera reference horizon estimate $\hat{Y}_0$, as set forth in claim 30, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and }$$

$$(C^{(N)})^t G^{(N)} = [S_1 \ \cdots \ S_k \ \cdots \ S_N \ T]^t, \text{ where}$$

$$R_k = \sum_{(i,j) \in \Theta_k} (r_{kj} - r_{ki})^2$$

$$P_k = \sum_{(i,j) \in \Theta_k} (r_{kj} - r_{ki})(d_{kj} - d_{ki})$$

$$Q = \sum_{k=1}^N q_k, \ q_k = \sum_{(i,j) \in \Theta_k} (d_{kj} - d_{ki})^2$$

$$S_k = \sum_{(i,j) \in \Theta_k} (r_{kj} - r_{ki})(r_{kj} d_{kj} - r_{kj} d_{ki})$$

$$T = \sum_{k=1}^N t_k, \ t_k = \sum_{(i,j) \in \Theta_k} (d_{kj} - d_{ki})(r_{kj} d_{kj} - r_{kj} d_{ki})$$

$k = 1, \ldots, N$
$\Theta_k = \{(i,j) \mid j = i + s, \ 1 <= i, \ j <= M_k\}$ where:
i and j are matrix index variables,
$\Theta_k$ is an index set including all possible pairings of $\{i,j\}$ that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{k1}=0$ for all k;
$d_{ki}$ is a distance traveled by a vehicle at the ith frame of the kth track relative to the first frame, with $d_{k1}=0$ for all k; and
whereby the terms $R_k$, $P_k$, $q_k$, $S_k$, and $t_k$ are computed incrementally as new track points are added and new pairs of $\{i,j\}$ become part of the index set $\Theta_k$.

32. A computer program product for generating a camera reference horizon estimate $\hat{Y}_0$ as set forth in claim 20, further comprising means for:
maintaining an active camera reference horizon estimate $\hat{Y}_0$; and
updating the active camera reference horizon estimate $\hat{Y}_0$ with the generated camera reference horizon estimate based on the fulfillment of a criteria set.

33. A computer program product for generating a camera reference horizon estimate $\hat{Y}_0$, as set forth in claim 32, wherein the images include image tops, and wherein in the means for updating the active camera reference horizon estimate $\hat{Y}_0$ is triggered based on the fulfillment of the criteria set including:
when a longest track exists in a number of images in the sequence of images, where the number exceeds a predetermined threshold; and when the longest track is within a predetermined distance from an image top.

34. A computer program product for generating a camera reference horizon estimate $\hat{Y}_0$, as set forth in claim 33, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i (d_i(Y_0 - r_i))^2 \\ -f \sum_i d_i(Y_0 - r_i) \end{bmatrix} \equiv \begin{bmatrix} W \\ Z \end{bmatrix}, \text{ where}$$

$$\begin{aligned}
U &= \sum_i (Y_0 - r_i)^2 = \sum_i r_i^2 - 2Y_0 \sum_i r_i + MY_0 \\
V &= -f \sum_i (Y_0 - r_i) = f\left(\sum_i r_i - MY_0\right) \\
W &= \sum_i (d_i(Y_0 - r_i))^2 = Y_0^2 \sum_i d_i^2 - 2Y_0 \sum_i d_i r_i + \sum_i d_i r_i^2 \\
Z &= -f \sum_i d_i(Y_0 - r_i) = f\left(\sum_i d_i r_i - Y_0 \sum_i d_i\right)
\end{aligned}, \text{ and}$$

where
the sum $\Sigma_i$ is i=1 to M;
f is a camera focal length,
M is a length of a track,
$r_i$ is a track location in an image,
$Y_0$ is the camera horizon, and
$d_i$ is the distance a vehicle hosting the camera has traveled since the first image;
whereby the matrices $A^t A$ and $A^t B$ can be updated incrementally as the HEP track length increases from M to M+1.

35. A computer program product for generating a camera reference horizon estimate $\hat{Y}_0$, as set forth in claim 34, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \ \cdots \ S_k \ \cdots \ S_N \ T]^t, \text{ where}$$

$$\begin{aligned}
R_k &= \sum_{(i,j) \in \Theta_k} (r_{kj} - r_{ki})^2 \\
P_k &= \sum_{(i,j) \in \Theta_k} (r_{kj} - r_{ki})(d_{kj} - d_{ki}) \\
Q &= \sum_{k=1}^N q_k, \ q_k = \sum_{(i,j) \in \Theta_k} (d_{kj} - d_{ki})^2 \\
S_k &= \sum_{(i,j) \in \Theta_k} (r_{kj} - r_{ki})(r_{kj} d_{kj} - r_{kj} d_{ki}) \\
T &= \sum_{k=1}^N t_k, \ t_k = \sum_{(i,j) \in \Theta_k} (d_{kj} - d_{ki})(r_{kj} d_{kj} - r_{kj} d_{ki})
\end{aligned} \Bigg\} \begin{array}{l} k = 1, \ldots, N \\ \Theta_k = \{(i,j) \mid j = i+s, \ 1 <= i, \ j <= M_k\} \end{array}$$

where:
i and j are matrix index variables, $\Theta_k$ is an index set including all possible pairings of {i,j} that are separated by a fixed number of frames s, k is an index variable of tracks where the total number of tracks is represented by N, $M_k$ is the length of the kth track among a total of N tracks,
$r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kl}=0$ for all k;

$d_{ki}$ is a distance traveled by a vehicle at the ith frame of the kth track relative to the first frame, with $d_{kl}=0$ for all k; and whereby the terms $R_k$, $P_k$, $q_k$, $S_k$, and $t_k$ are computed incrementally as new track points are added and new pairs of {i, j} become part of the index set $\Theta_k$.

36. A computer program product for generating a camera reference horizon estimate $\hat{Y}_0$, as set forth in claim 20, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

-continued $$A^t B = \begin{bmatrix} \sum_i (d_i(Y_0 - r_i))^2 \\ -f \sum_i d_i(Y_0 - r_i) \end{bmatrix} \equiv \begin{bmatrix} W \\ Z \end{bmatrix}, \text{ where}$$

$$U = \sum_i (Y_0 - r_i)^2 = \sum_i r_i^2 - 2Y_0 \sum_i r_i + MY_0$$

$$V = -f \sum_i (Y_0 - r_i) = f\left(\sum_i r_i - MY_0\right)$$

$$W = \sum_i (d_i(Y_0 - r_i))^2 = Y_0^2 \sum_i d_i^2 - 2Y_0 \sum_i d_i r_i + \sum_i d_i r_i^2$$

$$Z = -f \sum_i d_i(Y_0 - r_i) = f\left(\sum_i d_i r_i - Y_0 \sum_i d_i\right)$$

and where the sum $\sum_i$ is for $i = 1$ to $M$;

f is a camera focal length,
M is a length of a track,
$r_i$ is a track location in an image,
$Y_0$ is the camera horizon, and
$d_i$ is the distance a vehicle hosting the camera has traveled since the first image;

whereby the matrices $A^t A$ and $A^t B$ can be updated incrementally as the HEP track length increases from M to M+1.

37. A computer program product for generating a camera reference horizon estimate $\hat{Y}_0$, as set forth in claim 36, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [\, S_1 \;\cdots\; S_k \;\cdots\; S_N \; T \,]^t, \text{ where}$$

$$\left. \begin{aligned} R_k &= \sum_{(i,j)\in\Theta_k} (r_{kj} - r_{ki})^2 \\ P_k &= \sum_{(i,j)\in\Theta_k} (r_{kj} - r_{ki})(d_{kj} - d_{ki}) \\ Q &= \sum_{k=1}^{N} q_k, \; q_k = \sum_{(i,j)\in\Theta_k} (d_{kj} - d_{ki})^2 \\ S_k &= \sum_{(i,j)\in\Theta_k} (r_{kj} - r_{ki})(r_{kj}d_{kj} - r_{kj}d_{ki}) \\ T &= \sum_{k=1}^{N} t_k, \; t_k = \sum_{(i,j)\in\Theta_k} (d_{kj} - d_{ki})(r_{kj}d_{kj} - r_{kj}d_{ki}) \end{aligned} \right\} \begin{aligned} k &= 1, \ldots, N \\ \Theta_k &= \{(i,j) \mid j = i + s, \; 1 <= i, \; j <= M_k\} \end{aligned}$$

where:
i and j are matrix index variables,
$\Theta_k$ is an index set including all possible pairings of {i,j} that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{k1}=0$ for all k;
$d_{ki}$ is a distance traveled by a vehicle at the ith frame of the kth track relative to the first frame, with $d_{k1}=0$ for all k; and
whereby the terms $R_k$, $P_k$, $q_k$, $S_k$, and $t_k$ are computed incrementally as new track points are added and new pairs of {i,j} become part of the index set $\Theta_k$.

38. A computer program product for generating a camera reference horizon estimate $\hat{Y}_0$, as set forth in claim 20, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [\, S_1 \;\cdots\; S_k \;\cdots\; S_N \; T \,]^t, \text{ where}$$

-continued $$R_k = \sum_{(i,j) \in \Theta_k} (r_{kj} - r_{ki})^2$$

$$P_k = \sum_{(i,j) \in \Theta_k} (r_{kj} - r_{ki})(d_{kj} - d_{ki})$$

$$Q = \sum_{k=1}^{N} q_k, \quad q_k = \sum_{(i,j) \in \Theta_k} (d_{kj} - d_{ki})^2$$

$$S_k = \sum_{(i,j) \in \Theta_k} (r_{kj} - r_{ki})(r_{kj}d_{kj} - r_{kj}d_{ki})$$

$$T = \sum_{k=1}^{N} t_k, \quad t_k = \sum_{(i,j) \in \Theta_k} (d_{kj} - d_{ki})(r_{kj}d_{kj} - r_{kj}d_{ki})$$

$$k = 1, \ldots, N$$
$$\Theta_k = \{(i, j) \mid j = i + s, 1 \leq i, j \leq M_k\}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{k1}=0$ for all k;

$d_{ki}$ is a distance traveled by a vehicle at the ith frame of the kth track relative to the first frame, with $d_{k1}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

39. An apparatus for generating a camera reference horizon estimate $\hat{Y}_0$, the apparatus comprising:

a memory for storing data and processing results;

a processor operationally coupled with the memory, the processor including means for receiving a sequence of images including projections of objects thereon, with projections including horizontal edges, the processor including means for performing operations thereon, for:

estimating vertical motion occurring in the sequence of images and storing the estimated vertical motion as a motion history;

computing the projection of the horizontal edges in the images;

segmenting the projected horizontal edges in the images;

compensating for motion in the images using the estimated vertical motion from the motion history;

tracking the projections of the horizontal edges from image to image to generate tracks representing objects and maintaining an active track storage by adding more data to update the active track storage from each subsequent image;

screening the generated tracks using screening criteria to produce a subset of tracks in order to enhance track reliability;

receiving the subset of tracks from the means for screening and estimating distances to the objects represented by the tracks and heights of the objects represented by the tracks;

further screening the subset of tracks by calculating an error criteria for each track and selecting a subset of remaining tracks satisfying the error criteria; and generating a camera reference horizon estimate $\hat{Y}_0$ from the remaining tracks.

40. A apparatus for generating a camera reference horizon estimate $\hat{Y}_0$, as set forth in claim 39, wherein the screening criteria used by the means for screening include rejecting those tracks that are below the current reference horizon; determining a track length for each track and keeping only those tracks that have track lengths in excess of a predetermined track length threshold; determining the dynamic range of the tracks and keeping only those tracks that have a dynamic range exceeding a dynamic range threshold; and determining an abnormality value for each track and ignoring tracks exceeding an abnormality threshold.

41. A apparatus for generating a camera reference horizon estimate $\hat{Y}_0$, as set forth in claim 40, wherein in the means for further screening the subset of tracks, the error criteria used includes calculating a root-mean-squared fitting error for each track using the estimated distance and height, and excluding those tracks having a root-mean-squared fitting error exceeding a predetermined threshold.

42. A apparatus for generating a camera reference horizon estimate $\hat{Y}_0$, as set forth in claim 41, further comprising means for:

maintaining an active camera reference horizon estimate $\hat{Y}_0$; and updating the active camera reference horizon estimate $\hat{Y}_0$ with the generated camera reference horizon estimate based on the fulfillment of a criteria set.

43. A apparatus for generating a camera reference horizon estimate $\hat{Y}_0$, as set forth in claim 42, wherein the images include image tops, and wherein in the means for updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

44. A apparatus for generating a camera reference horizon estimate $\hat{Y}_0$, as set forth in claim 43, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & M f^2 \end{bmatrix} \equiv \begin{bmatrix} U & V \\ V & M f^2 \end{bmatrix}, \text{ and}$$

$$A^t B = \begin{bmatrix} \sum_i (d_i(Y_0 - r_i))^2 \\ -f \sum_i d_i(Y_0 - r_i) \end{bmatrix} \equiv \begin{bmatrix} W \\ Z \end{bmatrix}, \text{ where}$$

$$\left.\begin{array}{l} U = \sum_i (Y_0 - r_i)^2 = \sum_i r_i^2 - 2 Y_0 \sum_i r_i + M Y_0 \\ V = -f \sum_i (Y_0 - r_i) = f\left(\sum_i r_i - M Y_0\right) \\ W = \sum_i (d_i(Y_0 - r_i))^2 = Y_0^2 \sum_i d_i^2 - 2 Y_0 \sum_i d_i r_i + \sum_i d_i r_i^2 \\ Z = -f \sum_i d_i(Y_0 - r_i) = f\left(\sum_i d_i r_i - Y_0 \sum_i d_i\right) \end{array}\right\},$$

and where the sum $\sum_i$ is for $i = 1$ to $M$;

f is a camera focal length,
M is a length of a track,
$r_i$ is a track location in an image,
$Y_0$ is the camera horizon, and
$d_i$ is the distance a vehicle hosting the camera has traveled since the first image;

whereby the matrices $A^t A$ and $A^t B$ can be updated incrementally as the HEP track length increases from M to M+1.

45. A apparatus for generating a camera reference horizon estimate $\hat{Y}_0$, as set forth in claim 44, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \ T]^t, \text{ where}$$

$$\left.\begin{array}{l} R_k = \sum_{(i,j) \in \Theta_k} (r_{kj} - r_{ki})^2 \\ P_k = \sum_{(i,j) \in \Theta_k} (r_{kj} - r_{ki})(d_{kj} - d_{ki}) \\ Q = \sum_{k=1}^N q_k, \ q_k = \sum_{(i,j) \in \Theta_k} (d_{kj} - d_{ki})^2 \\ S_k = \sum_{(i,j) \in \Theta_k} (r_{kj} - r_{ki})(r_{kj} d_{kj} - r_{kj} d_{ki}) \\ T = \sum_{k=1}^N t_k, \ t_k = \sum_{(i,j) \in \Theta_k} (d_{kj} - d_{ki})(r_{kj} d_{kj} - r_{kj} d_{ki}) \end{array}\right\} \begin{array}{l} k = 1, \ldots, N \\ \Theta_k = \{(i,j) \mid j = i + s,\ 1 \leq i,\ j \leq M_k\} \end{array}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kl}=0$ for all k;

$d_{ki}$ is a distance traveled by a vehicle at the ith frame of the kth track relative to the first frame, with $d_{kl}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

46. A apparatus for generating a camera reference horizon estimate $\hat{Y}_0$, as set forth in claim 39, wherein in the means for further screening the subset of tracks, the error criteria used includes calculating a root-mean-squared fitting error for each track using the estimated distance and height, and excluding those tracks having a root-mean-squared fitting error exceeding a predetermined threshold.

47. A apparatus for generating a camera reference horizon estimate $\hat{Y}_0$, as set forth in claim 46, further comprising means for:

maintaining an active camera reference horizon estimate $\hat{Y}_0$; and updating the active camera reference horizon estimate $\hat{Y}_0$ with the generated camera reference horizon estimate based on the fulfillment of a criteria set.

48. A apparatus for generating a camera reference horizon estimate $\hat{Y}_0$, as set forth in claim 47, wherein the images include image tops, and wherein in the means for updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

49. A apparatus for generating a camera reference horizon estimate $\hat{Y}_0$, as set forth in claim 48, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^tA$ and $A^tB$ are:

$$A^t A = \begin{bmatrix} \sum_i (Y_0 - r_i)^2 & -f \sum_i (Y_0 - r_i) \\ -f \sum_i (Y_0 - r_i) & Mf^2 \end{bmatrix} \equiv \begin{bmatrix} U & V \\ V & Mf^2 \end{bmatrix}, \text{ and}$$

$$A^t B = \begin{bmatrix} \sum_i (d_i(Y_0 - r_i))^2 \\ -f \sum_i d_i(Y_0 - r_i) \end{bmatrix} \equiv \begin{bmatrix} W \\ Z \end{bmatrix}, \text{ where}$$

$$\left.\begin{aligned} U &= \sum_i (Y_0 - r_i)^2 = \sum_i r_i^2 - 2Y_0 \sum_i r_i + MY_0 \\ V &= -f \sum_i (Y_0 - r_i) = f\left(\sum_i r_i - MY_0\right) \\ W &= \sum_i (d_i(Y_0 - r_i))^2 = Y_0^2 \sum_i d_i^2 - 2Y_0 \sum_i d_i r_i + \sum_i d_i r_i^2 \\ Z &= -f \sum_i d_i(Y_0 - r_i) = f\left(\sum_i d_i r_i - Y_0 \sum_i d_i\right) \end{aligned}\right\},$$

and where the sum $\sum_i$ is for $i = 1$ to $M$;

f is a camera focal length,

M is a length of a track, $r_i$ is a track location in an image, $Y_0$ is the camera horizon, and $d_i$ is the distance a vehicle hosting the camera has traveled since the first image;

whereby the matrices $A^tA$ and $A^tB$ can be updated incrementally as the HEP track length increases from M to M+1.

50. A apparatus for generating a camera reference horizon estimate $\hat{Y}_0$, as set forth in claim 49, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \ T]^t, \text{ where}$$

$$\left. \begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^{N} q_k, \; q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{kj} - r_{kj} d_{ki}) \\ T &= \sum_{k=1}^{N} t_k, \; t_k = \sum_{(i,j) \in \Theta_k} (d_{kj} - d_{ki})(r_{kj} d_{kj} - r_{kj} d_{ki}) \end{aligned} \right\} \begin{aligned} k &= 1, \ldots, N \\ \Theta_k &= \{(i,j) \mid j = i + s, 1 <= i, j <= M_k\} \end{aligned}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kl}=0$ for all k;

$d_{ki}$ is a distance traveled by a vehicle at the ith frame of the kth track relative to the first frame, with $d_{kl}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

51. A apparatus for generating a camera reference horizon estimate $\hat{Y}_0$, as set forth in claim 39, further comprising means for:

maintaining an active camera reference horizon estimate $\hat{Y}_0$; and updating the active camera reference horizon estimate $\hat{Y}_0$ with the generated camera reference horizon estimate based on the fulfillment of a criteria set.

52. A apparatus for generating a camera reference horizon estimate $\hat{Y}_0$, as set forth in claim 51, wherein the images include image tops, and wherein in the means for updating the active camera reference horizon estimate $\hat{Y}_0$ is triggered based on the fulfillment of the criteria set including:

when a longest track exists in a number of images in the sequence of images, where the number exceeds a predetermined threshold; and when the longest track is within a predetermined distance from an image top.

53. A apparatus for generating a camera reference horizon estimate $\hat{Y}_0$, as set forth in claim 52, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & M f^2 \end{bmatrix} \equiv \begin{bmatrix} U & V \\ V & M f^2 \end{bmatrix}, \text{ and}$$

$$A^t B = \begin{bmatrix} \sum_i (d_i (Y_0 - r_i))^2 \\ -f \sum_i d_i (Y_0 - r_i) \end{bmatrix} \equiv \begin{bmatrix} W \\ Z \end{bmatrix}, \text{ where}$$

$$\left. \begin{aligned} U &= \sum_i (Y_0 - r_i)^2 = \sum_i r_i^2 - 2 Y_0 \sum_i r_i + M Y_0 \\ V &= -f \sum_i (Y_0 - r_i) = f \left( \sum_i r_i - M Y_0 \right) \\ W &= \sum_i (d_i (Y_0 - r_i))^2 = Y_0^2 \sum_i d_i^2 - 2 Y_0 \sum_i d_i r_i + \sum_i d_i r_i^2 \\ Z &= -f \sum_i d_i (Y_0 - r_i) = f \left( \sum_i d_i r_i - Y_0 \sum_i d_i \right) \end{aligned} \right\},$$

and where the sum $\sum_i$ is for $i = 1$ to $M$;

f is a camera focal length,

M is a length of a track, $r_i$ is a track location in an image, $Y_0$ is the camera horizon, and $d_i$ is the distance a vehicle hosting the camera has traveled since the first image;

whereby the matrices $A'A$ and $A'B$ can be updated incrementally as the HEP track length increases from M to M+1.

54. A apparatus for generating a camera reference horizon estimate $\hat{Y}_0$, as set forth in claim 53, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)}) G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \cdots S_k \cdots S_N \ T]^t, \text{ where}$$

$$\left.\begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^{N} q_k, \ q_k = \sum_{(i,j) \in \Theta_k} (d_{kj} - d_{ki})^2 \\ S_k &= \sum_{(i,j) \in \Theta_k} (r_{kj} - r_{ki})(r_{kj} d_{kj} - r_{kj} d_{ki}) \\ T &= \sum_{k=1}^{N} t_k, \ t_k = \sum_{(i,j) \in \Theta_k} (d_{kj} - d_{ki})(r_{kj} d_{kj} - r_{kj} d_{ki}) \end{aligned}\right\} \begin{aligned} k &= 1, \ldots, N \\ \Theta_k &= \{(i,j) \mid j = i+s, 1 \le i, j \le M_k\} \end{aligned}$$

where:

i and j are matrix index variables, $\Theta_k$ is an index set including all possible pairings of $\{i,j\}$ that are separated by a fixed number of frames s, k is an index variable of tracks where the total number of tracks is represented by N, $M_k$ is the length of the kth track among a total of N tracks, $r_{kj}$ is the track position in image row coordinates at a jth image frame of the kth track;

$r_{ki}$ is the track position in image row coordinates at a ith image frame of the kth track;

$d_{kj}$ is a distance traveled by a vehicle at the jth frame of the kth track relative to the first frame, with $d_{kj}=0$ for all k;

$d_{ki}$ is a distance traveled by a vehicle at the ith frame of the kth track relative to the first frame, with $d_{ki}=0$ for all k; and whereby the terms $R_k$, $P_k$, $q_k$, $S_k$, and $t_k$ are computed incrementally as new track points are added and new pairs of $\{i,j\}$ become part of the index set $\Theta_k$.

55. A apparatus for generating a camera reference horizon estimate $\hat{Y}_0$, as set forth in claim 39, wherein the means for estimating distances to the objects represented by the tracks and heights of the objects represented by the tracks is performed by estimating the parameters for distance $\hat{D}$ and height $\hat{H}$ in the linear set, $$A^t A \begin{bmatrix} \hat{D} \\ \hat{H} \end{bmatrix} = A^t B,$$

where matrices $A^t A$ and $A^t B$ are:

$$A^t A = \begin{bmatrix} \sum_i (Y_0 - r_i)^2 & -f \sum_i (Y_0 - r_i) \\ -f \sum_i (Y_0 - r_i) & M f^2 \end{bmatrix} \equiv \begin{bmatrix} U & V \\ V & M f^2 \end{bmatrix}, \text{ and}$$

$$A^t B = \begin{bmatrix} \sum_i (d_i (Y_0 - r_i))^2 \\ -f \sum_i d_i (Y_0 - r_i) \end{bmatrix} \equiv \begin{bmatrix} W \\ Z \end{bmatrix}, \text{ where}$$

-continued $$U = \sum_i (Y_0 - r_i)^2 = \sum_i r_i^2 - 2Y_0 \sum_i r_i + MY_0$$

$$V = -f \sum_i (Y_0 - r_i) = f\left(\sum_i r_i - MY_0\right)$$

$$W = \sum_i (d_i(Y_0 - r_i))^2 = Y_0^2 \sum_i d_i^2 - 2Y_0 \sum_i d_i r_i + \sum_i d_i r_i^2$$

$$Z = -f \sum_i d_i(Y_0 - r_i) = f\left(\sum_i d_i r_i - Y_0 \sum_i d_i\right)$$

where the sum $\sum_i$ is for $i = 1$ to $M$;

f is a camera focal length,
M is a length of a track, $$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and }$$

$$(C^{(N)})^t G^{(N)} = [S_1 \cdots S_k \cdots S_N \; T]^t, \text{ where}$$

$$R_k = \sum_{(i,j) \in \Theta_k} (r_{kj} - r_{ki})^2$$

$$P_k = \sum_{(i,j) \in \Theta_k} (r_{kj} - r_{ki})(d_{kj} - d_{ki})$$

$$Q = \sum_{k=1}^N q_k, \; q_k = \sum_{(i,j) \in \Theta_k} (d_{kj} - d_{ki})^2$$

$$S_k = \sum_{(i,j) \in \Theta_k} (r_{kj} - r_{ki})(r_{kj} d_{kj} - r_{kj} d_{ki})$$

$$T = \sum_{k=1}^N t_k, \; t_k = \sum_{(i,j) \in \Theta_k} (d_{kj} - d_{ki})(r_{kj} d_{kj} - r_{kj} d_{ki})$$

$k = 1, \ldots, N$
$\Theta_k = \{(i, j) \mid j = i + s, \; 1 \leq i, j \leq M_k\}$ where:
i and j are matrix index variables,
$\Theta_k$ is an index set including all possible pairings of $\{i,j\}$ that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{k1}=0$ for all k;
$d_{ki}$ is a distance traveled by a vehicle at the ith frame of the kth track relative to the first frame, with $d_{k1}=0$ for all k; and $r_i$ is a track location in an image,
$Y_0$ is the camera horizon, and
$d_i$ is the distance a vehicle hosting the camera has traveled since the first image;
whereby the matrices $A^tA$ and $A^tB$ can be updated incrementally as the HEP track length increases from M to M+1.

56. A apparatus for generating a camera reference horizon estimate $\hat{Y}_0$, as set forth in claim 55, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

whereby the terms $R_k$, $P_k$, $q_k$, $S_k$, and $t_k$ are computed incrementally as new track points are added and new pairs of $\{i,j\}$ become part of the index set $\Theta_k$.

57. A apparatus for generating a camera reference horizon estimate $\hat{Y}_0$, as set forth in claim 39, wherein in the means for generating a camera reference horizon estimate $\hat{Y}_0$ from the remaining tracks, the reference horizon is determined by solving for $\hat{Y}_0$ in the following relationship:

$$((C^{(N)})^t C^{(N)}) \begin{bmatrix} \hat{D} \\ \hat{Y}_0 \end{bmatrix} = (C^{(N)})^t G^{(N)},$$

where the equations for matrices $(C^{(N)})^t C^{(N)}$ and $(C^{(N)})^t G^{(N)}$ can be written as:

$$(C^{(N)})^t C^{(N)} = \begin{bmatrix} R_1 & \cdots & 0 & \cdots & 0 & P_1 \\ 0 & \ddots & 0 & \cdots & 0 & \vdots \\ 0 & \cdots & R_k & \cdots & 0 & P_k \\ 0 & \cdots & 0 & \ddots & 0 & \vdots \\ 0 & \cdots & 0 & \cdots & R_N & P_N \\ P_1 & \cdots & P_k & \cdots & P_N & Q \end{bmatrix} \text{ and}$$

$$(C^{(N)})^t G^{(N)} = [S_1 \ \cdots \ S_k \ \cdots \ S_N \ T]^t, \text{ where}$$

$$\left.\begin{aligned} R_k &= \sum_{(i,j) \in \Theta_k} (r_{kj} - r_{ki})^2 \\ P_k &= \sum_{(i,j) \in \Theta_k} (r_{kj} - r_{ki})(d_{kj} - d_{ki}) \\ Q &= \sum_{k=1}^{N} q_k, \ q_k = \sum_{(i,j) \in \Theta_k} (d_{kj} - d_{ki})^2 \\ S_k &= \sum_{(i,j) \in \Theta_k} (r_{kj} - r_{ki})(r_{kj}d_{kj} - r_{kj}d_{ki}) \\ T &= \sum_{k=1}^{N} t_k, \ t_k = \sum_{(i,j) \in \Theta_k} (d_{kj} - d_{ki})(r_{kj}d_{kj} - r_{kj}d_{ki}) \end{aligned}\right\} \begin{aligned} k &= 1, \ldots, N \\ \Theta_k &= \{(i,j) \mid j = i+s, 1 \le i, j \le M_k\} \end{aligned}$$

where:
i and j are matrix index variables,
$\Theta_k$ is an index set including all possible pairings of {i,j} that are separated by a fixed number of frames s,
k is an index variable of tracks where the total number of tracks is represented by N,
$M_k$ is the length of the kth track among a total of N tracks,
$r_{kj}$ is the track position in image row coordinates at a jth image frame of the kth track;
$r_{ki}$ is the track position in image row coordinates at a ith image frame of the kth track;
$d_{kj}$ is a distance traveled by a vehicle at the jth frame of the kth track relative to the first frame, with $d_{k1}$=0 for all k;
$d_{ki}$ is a distance traveled by a vehicle at the ith frame of the kth track relative to the first frame, with $d_{k1}$=0 for all k; and
whereby the terms $R_k$, $P_k$, $q_k$, $S_k$, and $t_k$ are computed incrementally as new track points are added and new pairs of {i,j} become part of the index set $\Theta_k$.

* * * * *